United States Patent
Zhamu et al.

(10) Patent No.: US 10,326,168 B2
(45) Date of Patent: Jun. 18, 2019

(54) PARTIALLY AND FULLY SURFACE-ENABLED ALKALI METAL ION-EXCHANGING ENERGY STORAGE DEVICES

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 955 days.

(21) Appl. No.: 14/121,050

(22) Filed: Jul. 25, 2014

(65) Prior Publication Data

US 2016/0028122 A1 Jan. 28, 2016
US 2017/0194665 A9 Jul. 6, 2017

Related U.S. Application Data

(62) Division of application No. 12/930,294, filed on Jan. 3, 2011, now Pat. No. 8,859,143.

(51) Int. Cl.
*H01M 10/0569* (2010.01)
*H01M 4/13* (2010.01)
(Continued)

(52) U.S. Cl.
CPC ......... *H01M 10/0569* (2013.01); *H01M 4/13* (2013.01); *H01M 4/366* (2013.01);
(Continued)

(58) Field of Classification Search
CPC ......... H01M 10/0569; H01M 10/0565; H01M 4/60; H01M 4/13; H01M 4/366;
(Continued)

(56) References Cited

U.S. PATENT DOCUMENTS 4,513,067 A 4/1985 Kuo et al.
4,514,478 A 4/1985 Binder et al.
(Continued)

FOREIGN PATENT DOCUMENTS

CN 101420021 A 4/2009
JP 2007180429 A 7/2007
(Continued)

OTHER PUBLICATIONS

Decision_to_Grant_a_Patent_(Translated),May 1, 2018 (Year: 2018).*
(Continued)

*Primary Examiner* — Alexander Usyatinsky

(57) ABSTRACT

A surface-enabled, metal ion-exchanging battery device comprising a cathode, an anode, a porous separator, and a metal ion-containing electrolyte, wherein the metal ion is selected from (A) non-Li alkali metals; (B) alkaline-earth metals; (C) transition metals; (D) other metals such as aluminum (Al); or (E) a combination thereof; and wherein at least one of the electrodes contains therein a metal ion source prior to the first charge or discharge cycle of the device and at least the cathode comprises a functional material or nano-structured material having a metal ion-capturing functional group or metal ion-storing surface in direct contact with said electrolyte, and wherein the operation of the battery device does not involve the introduction of oxygen from outside the device and does not involve the formation of a metal oxide, metal sulfide, metal selenide, metal telluride, metal hydroxide, or metal-halogen compound. This energy storage device has a power density significantly higher than that of a lithium-ion battery and an energy density dramatically higher than that of a supercapacitor.

13 Claims, 14 Drawing Sheets

(51) Int. Cl.

| | |
|---|---|
| H01M 4/36 | (2006.01) |
| H01M 4/62 | (2006.01) |
| H01M 10/054 | (2010.01) |
| H01M 10/0568 | (2010.01) |
| H01M 4/60 | (2006.01) |
| H01M 10/0565 | (2010.01) |
| H01M 4/02 | (2006.01) |

(52) U.S. Cl.
CPC .......... H01M 4/606 (2013.01); H01M 4/622 (2013.01); H01M 4/625 (2013.01); H01M 10/054 (2013.01); H01M 10/0565 (2013.01); H01M 10/0568 (2013.01); H01M 2004/028 (2013.01); H01M 2300/0028 (2013.01)

(58) Field of Classification Search
CPC .... H01M 4/622; H01M 4/625; H01M 10/054; H01M 10/0568; H01M 4/606; H01M 2300/0028; H01M 2004/028
See application file for complete search history.

(56) References Cited

U.S. PATENT DOCUMENTS

| | | | |
|---|---|---|---|
| 4,731,309 A | 3/1988 | Hoffman | |
| 4,835,074 A | 5/1989 | Bolster et al. | |
| 5,200,281 A | 4/1993 | Leap et al. | |
| 5,989,743 A | 11/1999 | Yamashita | |
| 6,014,030 A | 1/2000 | Smith et al. | |
| 6,094,338 A | 7/2000 | Hirahara et al. | |
| 6,383,682 B1 | 5/2002 | Amatucci | |
| 6,639,381 B2 | 10/2003 | Tamura et al. | |
| 6,771,045 B1 | 8/2004 | Keller | |
| 7,071,258 B1 | 7/2006 | Jang et al. | |
| 7,623,340 B1 | 11/2009 | Song et al. | |
| 7,682,736 B2 | 3/2010 | Kuboki et al. | |
| 7,745,047 B2 | 6/2010 | Zhamu et al. | |
| 7,759,008 B2 | 7/2010 | Barker et al. | |
| 8,236,452 B2 | 8/2012 | Zhamu et al. | |
| 8,252,069 B2 | 8/2012 | Feng et al. | |
| 2002/0172865 A1 | 11/2002 | Che et al. | |
| 2002/0182495 A1 | 12/2002 | Ogura | |
| 2004/0048157 A1 | 3/2004 | Neudecker | |
| 2004/0081895 A1 | 4/2004 | Adachi | |
| 2004/0131940 A1 | 7/2004 | Suzuki | |
| 2005/0196670 A1* | 9/2005 | Yamaguchi | H01M 4/134 429/200 |
| 2005/0238961 A1* | 10/2005 | Barker | C01B 25/455 429/231.4 |
| 2006/0003229 A1 | 1/2006 | Sai-Cheong | |
| 2006/0017421 A1 | 1/2006 | Solie et al. | |
| 2007/0077495 A1 | 4/2007 | Yazami et al. | |
| 2007/0092432 A1 | 4/2007 | Prud Homme | |
| 2007/0190422 A1* | 8/2007 | Morris | H01M 4/364 429/231.4 |
| 2008/0111521 A1 | 5/2008 | So et al. | |
| 2008/0113269 A1 | 5/2008 | Yamamoto | |
| 2008/0261112 A1 | 10/2008 | Nagata | |
| 2008/0279756 A1 | 11/2008 | Zhamu | |
| 2009/0029257 A1 | 1/2009 | Ando et al. | |
| 2009/0092899 A1 | 4/2009 | Treger | |
| 2009/0098463 A1 | 4/2009 | Liu et al. | |
| 2009/0103241 A1 | 4/2009 | Kikuchi et al. | |
| 2009/0117466 A1 | 5/2009 | Zhamu | |
| 2009/0117467 A1* | 5/2009 | Zhamu | H01M 4/133 429/231.8 |
| 2009/0176159 A1 | 7/2009 | Zhamu | |
| 2009/0186267 A1 | 7/2009 | Tiegs | |
| 2009/0246625 A1 | 10/2009 | Lu | |
| 2010/0021819 A1 | 1/2010 | Zhamu | |
| 2010/0028681 A1 | 2/2010 | Dai et al. | |
| 2010/0035093 A1 | 2/2010 | Ruoff | |
| 2010/0119943 A1* | 5/2010 | Lee | H01M 4/48 429/220 |
| 2010/0140554 A1 | 6/2010 | Oki et al. | |
| 2010/0159366 A1 | 6/2010 | Shao-Horn et al. | |
| 2010/0176337 A1 | 7/2010 | Zhamu | |
| 2010/0178531 A1* | 7/2010 | Amaratunga | B82Y 30/00 429/7 |
| 2010/0178543 A1 | 7/2010 | Gruner et al. | |
| 2010/0285358 A1 | 11/2010 | Cui et al. | |
| 2010/0310908 A1 | 12/2010 | Zhang et al. | |
| 2011/0052998 A1 | 3/2011 | Liang et al. | |
| 2011/0070495 A1 | 3/2011 | Ban et al. | |
| 2011/0104571 A1* | 5/2011 | Zhamu | H01B 1/122 429/231.95 |
| 2011/0135990 A1* | 6/2011 | Yamamoto | H01M 4/136 429/144 |
| 2011/0163723 A1 | 7/2011 | Tan et al. | |
| 2011/0275005 A1 | 11/2011 | Zhu et al. | |
| 2012/0045688 A1 | 2/2012 | Liu et al. | |
| 2012/0077080 A1 | 3/2012 | Liu et al. | |
| 2012/0171574 A1 | 7/2012 | Zhamu et al. | |

FOREIGN PATENT DOCUMENTS

| | | | |
|---|---|---|---|
| JP | 2009245903 A | | 10/2009 |
| WO | 2005022666 A2 | | 3/2005 |
| WO | WO 2005/0226666 | * | 10/2005 |
| WO | 2008124167 A1 | | 10/2008 |
| WO | 2010013837 A1 | | 2/2010 |
| WO | WO 2010/013837 | * | 2/2010 |

OTHER PUBLICATIONS

U.S. Appl. No. 11/800,728, filed May 8, 2007, A. Zhamu, et al.
U.S. Appl. No. 12/806,679, filed Aug. 9, 2010, C. G. Liu, et al.
U.S. Appl. No. 12/924,211, filed Sep. 23, 2010, C. G. Liu, et al.
T. Le Gall, et al. J. Power Sources, 119 (2003) 316-320.
H. Chen, et al. "From biomass to a renewable LixC6O6 organic electrode for sustainable Li-ion batteries," ChemSusChem, 1 (2008) 348-355.
S. W. Lee, et al, "High Power Lithium Batteries from Functionalized Carbon Nanotubes," Nature Nanotechnology, 5 (2010) 531-537.
X. Y. Han, et al. "Aromatic carbonyl derivative polymers as high-performance Li-ion storage materials," Adv. Material, 19, 1616-1621 (2007).
J. F. Xiang, et al. "A novel coordination polymer as positive electrode material for lithium ion battery," Crystal Growth & Design, 8, 280-282 (2008).
Q.T. Qu, Y. Shi, S. Tian, Y.H. Chen, Y.P. Wu, R. Holze, Journal of Power Sources, 194 (2009) 1222.
L. Athouel, F. Moser, R. Dugas, O. Crosnier, D. Belanger, T. Brousse, Journal of Physical Chemistry C 112 (2008) 7270.
Zhuo, X.Y. Wang, A.P. Tang, Z.M. Liu, S. Gamboa, P.J. Sebastian, Journal of Power Sources 160 (2006) 698.
J. F. Whitacre, et al "Na4Mn9O18 as a positive electrode material for an aqueous electrolyte sodium-ion energy storage device," Electrochem. Commu. 12 (2010) 463-466.
Athouel et al., "Variation of the MnO2 Birnessite Structure upon Charge/Discharge in an Electrochemical Supercapacitor Electrode in Aqueous Na2SO4 Electrolyte" Journal of Physical Chemistry (2008) vol. 112, p. 7270.
Chen et al., "From biomass to a renewable LixC6O6 organic electrode for sustainable Li-ion batteries" ChemSusChem (2008) vol. 1, pp. 348-355.
Guo et al., "Study on preparation of activated mesocarbon microbeads/ expanded graphite composites for electrical double layer capacitors" Composites Science and Technology (2007) vol. 67, pp. 1747-1750.
Han et al., "Aromatic carbonyl derivative polymers as high-performance Li-ion storage materials" Adv. Material (2007) vol. 19, pp. 1616-1621.
Lee et al., "High Power Lithium Batteries from Functionalized Carbon Nanotubes" Nature Nanotechnology (2010) vol. 5, pp. 531-537.

(56) References Cited

OTHER PUBLICATIONS

LeGall et al., "Poly(2,5-dihydroxy-1,4-benzoquinone-3,6-methylene): a new organic polymer as positive electrode material for rechargeable lithium batteries" Journal of Power Sources (2003) vols. 119-121, pp. 316-320.

Li et al., "Mesoporous Co304 Nanowire arrays for lithium ion batteries with high capacity and rate capability" Nano Letters (2008) vol. 8, No. 1, pp. 265-270.

Park et al., "Employment of encapsulated Si with mesoporous TiO2 layer as anode material for lithium secondary batteries" Trans. Nonferrous Met. Soc. China (2009) vol. 19, pp. 1023-1026.

Poizot et al., "Nano-sized transition-metal oxides as negative-electrode materials for lithium-ion batteries" Nature (2000) vol. 407, pp. 496-499.

Qu et al., "A new cheap asymmetric aqueous supercapacitor: Activated carbon//namno2" Journal of Power Sources (2009) vol. 194, p. 1222-1225.

Ruffo et al., "Impedance Analysis of Silicon Nanowire Lithium Ion Battery Anodes" J.Phys. Chem. C (2009) vol. 113, pp. 11390-11398.

Wang et al., "Performance of AC/graphite capacitors at high weight ratios of AC/graphite" Journal of Power Sources (2008) vol. 177, pp. 681-684.

Whitacre et al., "Na4Mn9O18 as a positive electrode material for an aqueous electrolyte sodium-ion energy storage device" Electrochem. Commu. (2010) vol. 12, pp. 463-466.

Xiang et al., "A novel coordination polymer as positive electrode material for lithium ion battery" Crystal Growth & Design (2008) vol. 8, pp. 280-282.

Zheng et al., "High Energy Density Electrochemical Capacitors Without Consumption of Electrolyte" Journal of the Electrochemical Society (2009) vol. 156, No. 7, pp. A500-A505.

Zheng et al., "Theoretical Energy Density for Electrochemical Capacitors with Intercalation Electrodes" Journal of the Electrochemical Society (2005) vol. 152, No. 9, A1864-A1869.

Zhuo et al., "The preparation of NaV1—xCrxPO4F cathode materials for sodium-ion battery" Journal of Power Sources (2006) vol. 160, p. 698-703.

English language translation of Japanese Patent No. JP2007180429A Lithium Ion Capacitor.

English language translation of Japanese Patent No. JP2009245903A Composite Electrode.

WO2010013837A1 English language translation from ESPACENET.

* cited by examiner

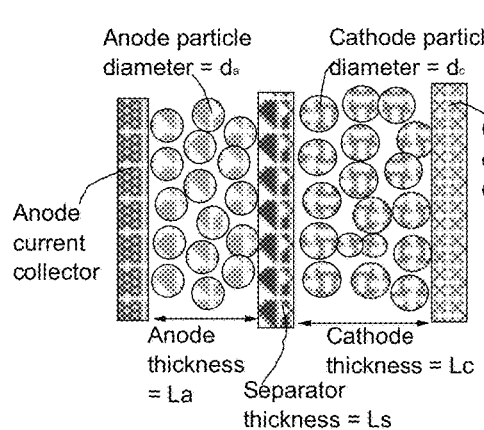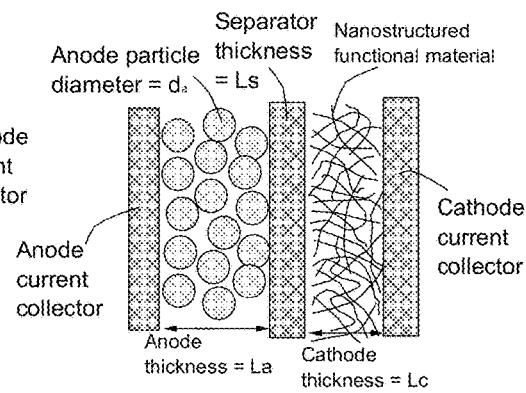
FIG. 1(A) PRIOR ART  FIG. 1(B)
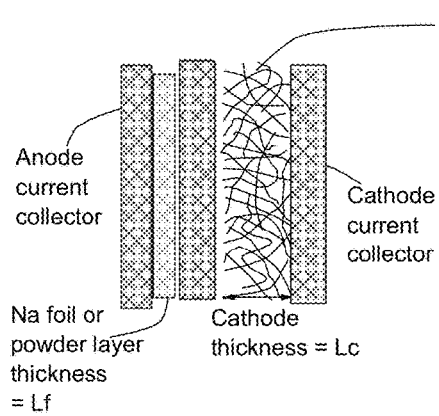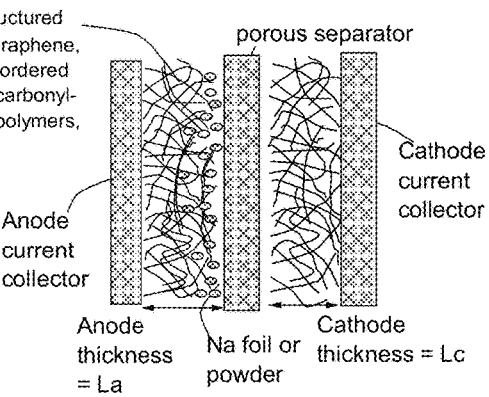
FIG. 1(C)  FIG. 1(D)

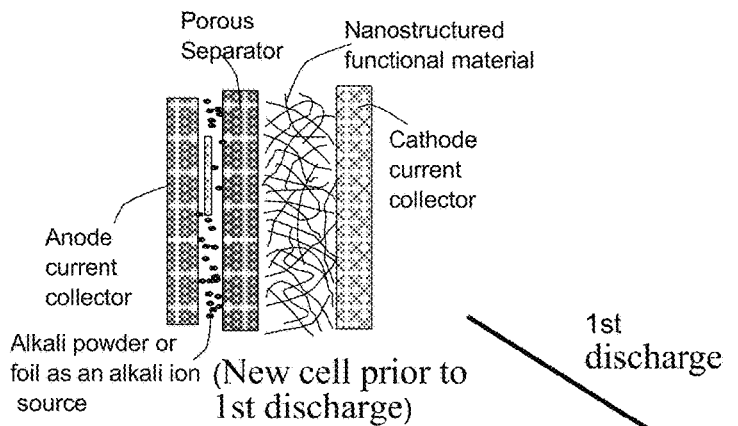
FIG. 2(A)
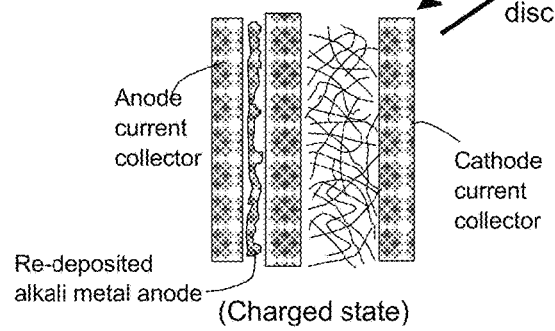
FIG. 2(B)
FIG. 2(C)

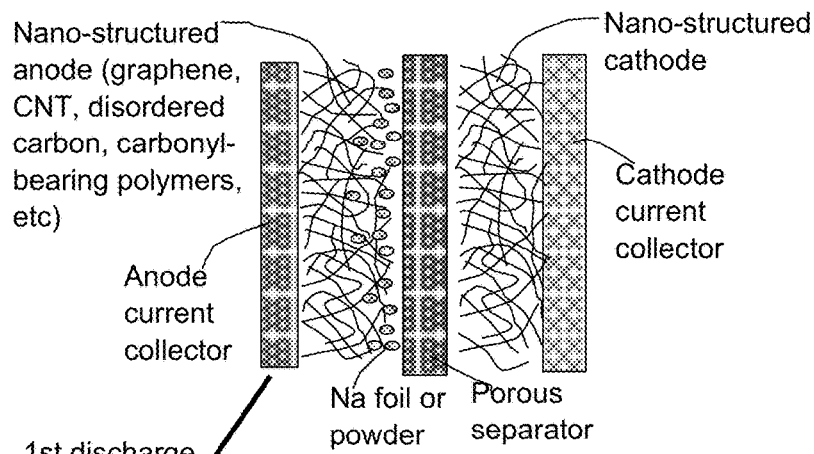
FIG. 4(A) before 1st charge
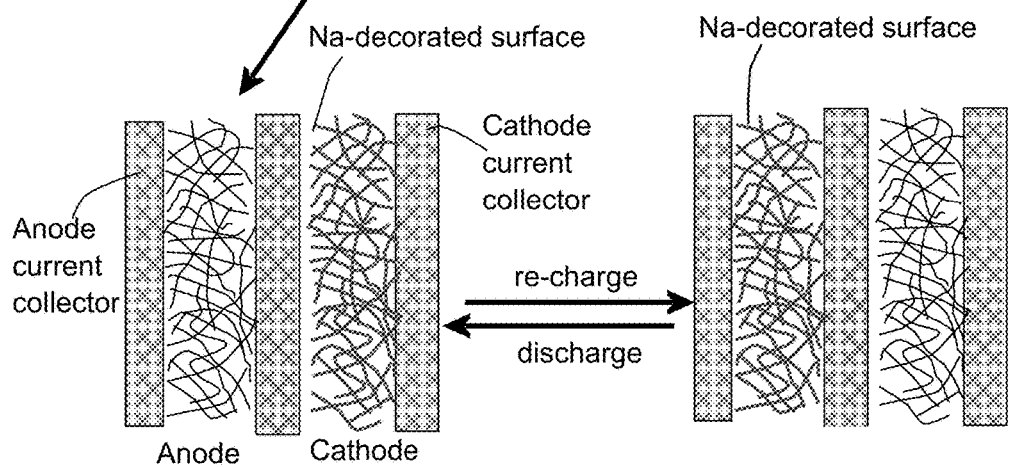
FIG. 4(B) discharged state     FIG. 4(C) charged state

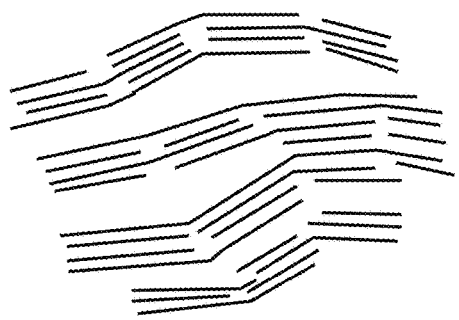
Soft carbon
FIG. 6(A)
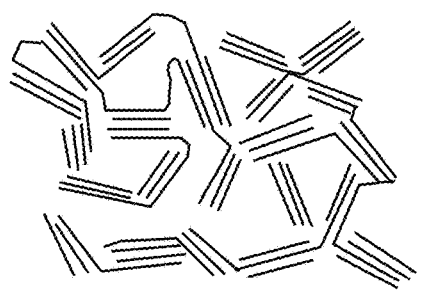
Hard carbon
FIG. 6(B)
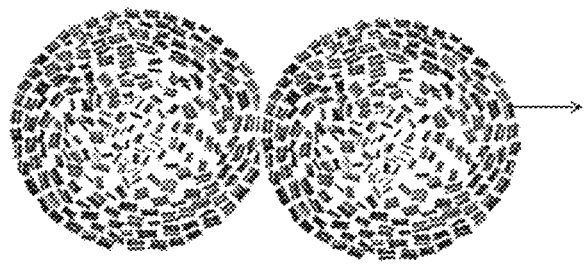
Carbon Black
FIG. 6(C)
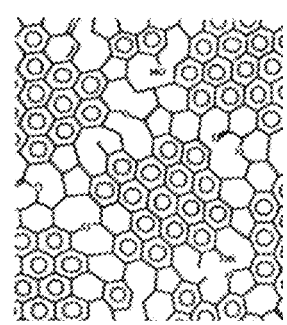
Enlarged view of a small graphene-like domain in carbon black
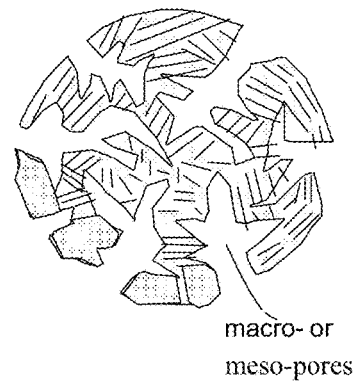
macro- or meso-pores
FIG. 6(D)

PARTIALLY AND FULLY SURFACE-ENABLED ALKALI METAL ION-EXCHANGING ENERGY STORAGE DEVICES

This application is a divisional of U.S. patent application Ser. No. 12/930,294 (submitted Jan. 3, 2011).

This is a co-pending application of A. Zhamu, et al "Surface-Controlled, Lithium Ion-Exchanging Energy Storage Device," US Patent Application Submitted on Dec. 22, 2010.

This invention is based on the research results of a project sponsored by the US National Science Foundation SBIR-STTR Program.

FIELD OF THE INVENTION

The present invention relates generally to the field of electrochemical energy storage devices and, more particularly, to a totally new metal ion-exchanging battery device wherein the operation of either the cathode or both the anode and the cathode is intercalation-free (i.e. does not involve metal ion diffusion in and out of the bulk of a solid electrode-active material). The metal ions are exchanged between an anode active material and a cathode active material during charge or discharge cycles. The metal ion storage mechanism in either the cathode or both the anode and the cathode is electrode active material surface-controlled or, more accurately, "surface-mediated" or "surface-enabled", obviating the need for solid-state diffusion (intercalation and de-intercalation) of metal atoms or ions, which otherwise is very slow. This device has the high energy density of a modern battery and a power density that is orders of magnitude higher than those of lithium-ion batteries. The power density is even higher than those of conventional supercapacitors. This device is herein referred to as a surface-controlled or surface-enabled, metal ion-exchanging battery device. The metal ion is selected from alkali metals (not including lithium alone), alkaline-earth metals, transition metals, and other metals (e.g., aluminum, gallium, indium, tin, bismuth, and lead).

BACKGROUND OF THE INVENTION

Supercapacitors (Ultra-Capacitors or Electro-Chemical Capacitors):

Supercapacitors are being considered for electric vehicle (EV), renewable energy storage, and modern grid applications. The high volumetric capacitance density of a supercapacitor (10 to 100 times greater than those of electrolytic capacitors) derives from using porous electrodes to create a large surface area conducive to the formation of diffuse double layer charges. This electric double layer (EDL) is created naturally at the solid-electrolyte interface when voltage is imposed. This implies that the specific capacitance of a supercapacitor is directly proportional to the specific surface area of the electrode material, e.g. activated carbon. This surface area must be accessible by electrolyte and the resulting interfacial zones must be sufficiently large to accommodate the EDL charges.

This EDL mechanism is based on surface ion adsorption. The required ions are pre-existing in a liquid electrolyte and do not come from the opposite electrode. In other words, the required ions to be deposited on the surface of a negative electrode (anode) active material (e.g., activated carbon particle) do not come from the positive electrode (cathode) side, and the required ions to be deposited on the surface of a cathode active material do not come from the anode side. When a supercapacitor is re-charged, local positive ions are deposited onto or close to a surface of a negative electrode with their matting negative ions staying close side by side (typically via local molecular or ionic polarization of charges). At the other electrode, negative ions are deposited onto or close to a surface of this positive electrode with the matting positive ions staying close side by side. Again, there is no exchange of ions between an anode active material and a cathode active material.

In some supercapacitors, the stored energy is further augmented by pseudo-capacitance effects due to some electrochemical reactions (e.g., redox). In such a pseudo-capacitor, the ions involved in a redox pair also pre-exist in the same electrode. Again, there is no exchange of ions between an anode active material and a cathode active material.

Since the formation of EDLs does not involve a chemical reaction or an exchange of ions between the two opposite electrodes, the charge or discharge process of an EDL supercapacitor can be very fast, typically in seconds, resulting in a very high power density (typically 5,000-10,000 W/Kg). Compared with batteries, supercapacitors offer a higher power density, require no maintenance, offer a much higher cycle-life, require a very simple charging circuit, experience no "memory effect," and are generally much safer. Physical, rather than chemical, energy storage is the key reason for their safe operation and extraordinarily high cycle-life.

Despite the positive attributes of supercapacitors, there are several technological barriers to widespread implementation of supercapacitors for various industrial applications. For instance, supercapacitors possess very low energy densities when compared to batteries (e.g., 5-8 Wh/kg for commercial supercapacitors vs. 10-30 Wh/Kg for the lead acid battery and 50-100 Wh/kg for the NiMH battery). Lithium-ion batteries possess a much higher energy density, typically in the range of 100-180 Wh/kg, based on the cell weight.

Lithium-ion Batteries:

Although possessing a much higher energy density, lithium-ion batteries deliver a very low power density (typically 100-500 W/Kg), requiring typically hours for re-charge. Conventional lithium-ion batteries also pose some safety concern.

The low power density or long re-charge time of a lithium ion battery is due to the mechanism of shuttling lithium ions between an anode active material and a cathode active material, which requires lithium ions to intercalate into the bulk of anode active material particles during re-charge, and into the bulk of cathode active material particles during discharge. For instance, as illustrated in FIG. 1(A), in a most commonly used lithium-ion battery featuring graphite particles as an anode active material, lithium ions are required to diffuse into the inter-planar spaces of a graphite crystal at the anode during re-charge. Most of these lithium ions have to come all the way from the cathode side by diffusing out of the bulk of a cathode active particle (e.g. lithium cobalt oxide, lithium iron phosphate, or other lithium insertion compound) through the pores of a solid separator (pores being filled with a liquid electrolyte), and into the bulk of a graphite particle at the anode. During discharge, lithium ions diffuse out of the anode active material, migrate through the liquid electrolyte phase, and then diffuse into the bulk of complex cathode crystals.

These intercalation or diffusion processes require a long time to accomplish because solid-state diffusion (or diffusion inside a solid) is difficult and slow. This is why, for instance, the current lithium-ion battery for plug-in hybrid vehicles requires 2-7 hours of recharge time, as opposed to just seconds for supercapacitors. The above discussion suggests that an energy storage device that is capable of storing as much energy as in a battery and yet can be fully recharged in one or two minutes like a supercapacitor would be considered a revolutionary advancement in energy storage technology.

Partially Surface-Controlled Lithium Ion-Exchanging Batteries or Lithium Super-Batteries:

Instead of using an inorganic lithium intercalation compound, such as $LiCoO_2$ and $LiFePO_4$, that requires lithium insertion into and extraction from the bulk of an inorganic particle (typically 100 nm-20 μm, but more typically 1-10 μm in diameter), several attempts have been made to use organic molecules or polymers as an electrode active material for the cathode (lithium metal alone as the anode). For instance, Le Gall, et al investigated Poly(2,5-dihydroxy-1,4-benzoquinone-3,6-methylene) as an organic polymer cathode [T. Le Gall, et al. J. Power Sources, 119 (2003) 316-320] and Chen, et al used $Li_xC_6O_6$ organic cathode, obtained from a renewable source, in a lithium ion battery [H. Chen, et al. "From biomass to a renewable $Li_xC_6O_6$ organic electrode for sustainable Li-ion batteries," ChemSusChem, 1 (2008) 348-355]. In addition, X. Y. Han, et al. studied carbonyl derivative polymers ["Aromatic carbonyl derivative polymers as high-performance Li-ion storage materials," Adv. Material, 19, 1616-1621 (2007)] and J. F. Xiang, et al. studied a coordination polymer as a cathode ["A novel coordination polymer as positive electrode material for lithium ion battery," Crystal Growth & Design, 8, 280-282 (2008)].

Unfortunately, these organic materials exhibit very poor electronic conductivity and, hence, electrons could not be quickly collected or could not be collected at all. Although these organic molecules contain carbonyl groups (>C=O) that could readily react with lithium ions (forming a redox pair), this redox mechanism was overwhelmed by the poor electronic conductivity. As a result, the battery cells featuring these organic molecules exhibit poor power densities. Le Gall et al added a large proportion of conductive acetylene black (typically 40-60% by weight) to partially overcome the conductivity issue; but, acetylene black significantly dilutes the amount of the active material. Further, the best achievable specific capacity of 150 mAh/g is far less than the theoretical specific capacity of 705 mAh/g of Poly(2,5-dihydroxy-1,4-benzoquinone-3,6-methylene).

Recently, more electrically conducting carbon nano-tubes (CNTs) containing carbonyl groups were used by Lee, et al to replace the organic molecules for use as a cathode material [S. W. Lee, et al, "High Power Lithium Batteries from Functionalized Carbon Nanotubes," Nature Nanotechnology, 5 (2010) 531-537]. The significantly higher electronic conductivity of CNTs does serve to overcome the poor conductivity problem of organic molecules. However, the CNT-based electrodes prepared by the layer-by-layer (LBL) approach still suffer from several technical and economical issues. Some of these issues are:

(1) CNTs are known to be extremely expensive due to the low yield, low production rate, and low purification rate commonly associated with the current CNT preparation processes. The high material costs have significantly hindered the widespread application of CNTs.

(2) CNTs tend to form a tangled mass resembling a hairball, which is difficult to work with (e.g., difficult to disperse in a liquid solvent or resin matrix).

(3) The so-called "layer-by-layer" approach (LBL) used by Lee, et al is a slow and expensive process that is not amenable to large-scale fabrication of battery electrodes, or mass production of electrodes with an adequate thickness (most of the batteries have an electrode thickness of 100-300 μm). The thickness of the LBL electrodes produced by Lee, et al (a noted MIT research group) was limited to 3 μm or less.

(4) One might wonder how the thickness of the LBL CNT electrodes would impact their performance. The data provided by Lee, et al (e.g. Fig. S-7 of the Supporting Material of Lee, et al) show that the power density dropped by one order of magnitude when the LBL CNT electrode thickness was increased from 0.3 μm to 3.0 μm. The performance is likely to drop even further if the electrode thickness is increased to that of a useful battery or supercapacitor electrode (e.g., 100-300 μm).

(5) Although the ultra-thin LBL CNT electrodes provide a high power density (since Li ions only have to travel an extremely short distance at the cathode), Lee, et al showed that the CNT-based composite electrodes prepared without using the LBL approach did not exhibit particularly good performance.

(6) CNTs have very limited amount of suitable sites to accept a functional group without damaging the basal plane or graphene plane structure. A CNT has only one end that is readily functionalizable and this end is an extremely small proportion of the total CNT surface. By chemically functionalizing the exterior basal plane, one could dramatically compromise the electronic conductivity of a CNT.

Most recently, our research groups have reported, in two patent applications, the development of lithium ion-exchanging super-batteries and two new classes of highly conducting cathode active materials for use in these super-batteries. Each class of cathode active material has a functional group that is capable of rapidly and reversibly forming a redox reaction with lithium ions. These materials are nano graphene (both single-layer graphene and multi-layer graphene sheets, collectively referred to as nano graphene platelets, NGPs) and disordered carbon (including soft carbon and hard carbon). These two patent applications are: C. G. Liu, et al., "Lithium Super-battery with a Functionalized Nano Graphene Cathode," U.S. patent application Ser. No. 12/806,679 (Aug. 19, 2010) and C. G. Liu, et al, "Lithium Super-battery with a Functionalized Disordered Carbon Cathode," U.S. patent application Ser. No. 12/924,211 (Sep. 23, 2010).

These new types of cathode active materials (used in the so-called lithium super-battery or, in the present context, a partially surface-controlled lithium ion-exchanging battery) include a chemically functionalized nano graphene platelet (NGP) or a functionalized disordered carbon material (such as soft carbon and hard carbon) having certain specific functional groups capable of reversibly and rapidly forming a redox pair with a lithium ion during the charge and discharge cycles of a battery cell. An NGP is a single-layer graphene sheet or a stack of several graphene sheets with each sheet being a hexagonal structure of carbon atoms (single layer being as thin as 0.34 nm). In these two patent applications, the functionalized disordered carbon or NGP is used in the cathode (not the anode) of the lithium super-battery. In this cathode, lithium ions in the liquid electrolyte only have to migrate to the edges or surfaces of graphene sheets (in the case of functionalized NGP cathode), or the edges/surfaces of the aromatic ring structures (small graphene sheets) in a disordered carbon matrix. No solid-state diffusion is required at the cathode. The presence of a functionalized graphene or carbon enables reversible storage of lithium on the surfaces (including edges), not the bulk, of the cathode material. Such a cathode material provides one type of lithium-storing or lithium-capturing surface. Typically, this surface has a functional group thereon capable of forming a redox pair with a lithium ion. Another type of lithium-storing surface is based on simple lithium deposition on a surface of a nano-structured functional material.

In conventional lithium-ion batteries, lithium ions must diffuse into the bulk of a cathode active material during discharge and out of the bulk of the cathode active material during re-charge. In these conventional lithium-ion batteries, lithium ions must also diffuse in and out of the inter-planar spaces in a graphite crystal serving as an anode active material. The lithium insertion or extraction procedures at both the cathode and the anode are very slow. Due to these slow solid-state diffusion processes of lithium in and out of these intercalation compounds, the conventional lithium ion batteries do not exhibit a high power density and the batteries require a long re-charge time. None of these conventional devices rely on select functional groups (e.g. attached at the edge or basal plane surfaces of a graphene sheet) that readily and reversibly form a redox reaction with a lithium ion from a lithium-containing electrolyte.

In contrast, the lithium super-battery as reported in our two earlier patent applications (U.S. application Ser. No. 12/806,679 and 12/924,211), relies on the operation of a fast and reversible reaction between a functional group (attached or bonded to a graphene structure at the cathode) and a lithium ion in the electrolyte. Lithium ions coming from the anode side through a separator only have to diffuse, in the liquid electrolyte, to reach a surface/edge of a graphene plane at the cathode. These lithium ions do not need to diffuse into or out of the interior of a solid particle. Since no diffusion-limited intercalation is involved at the cathode, this process is fast and can occur in seconds. Hence, this is a totally new class of hybrid supercapacitor-battery that exhibits unparalleled and unprecedented combined performance of an exceptional power density, high energy density, long and stable cycle life, and wide operating temperature range. This device has the best of both battery and super-capacitor worlds.

In the lithium super-batteries described in these two patent applications, the anode comprises either particles of a lithium titanate-type anode active material (still requiring solid state diffusion at the anode), as schematically illustrated in FIG. 1(B), or a lithium foil alone (without a nano-structured material to support or capture the returning lithium ions/atoms during recharge), as illustrated in FIG. 1(C). In the latter case, lithium has to deposit onto the front surface of an anode current collector alone (e.g. copper foil) when the battery is re-charged. Since the specific surface area of a current collector is very low (typically <<1 $m^2$/gram), the over-all lithium re-deposition rate is relatively low and this process still can become surface area-limited.

Fully Surface-Controlled (Surface-Enabled), Lithium Ion-Exchanging Battery Device Another superior energy storage device that also operates on lithium ion exchange between the cathode and the anode was reported in a co-pending patent application of ours [A. Zhamu, et al., "Surface-Controlled, Lithium Ion-Exchanging Energy Storage Device," US Patent Application Submitted on Dec. 22, 2010]. In this new device, both the cathode and the anode (not just the cathode) have a lithium-capturing or lithium-storing surface (typically both being nano-structured with many lithium-storing surfaces) and both electrodes (not just the cathode) obviate the need to engage in solid-state diffusion. Both the anode and the cathode have large amounts of surface areas to allow lithium ions to deposit thereon simultaneously, enabling dramatically higher charge and discharge rates and higher power densities. The uniform dispersion of these surfaces of a nano-structured material (e.g. graphene, CNT, disordered carbon, nano-wire, and nano-fiber) in an electrode also provides a more uniform electric field in the electrode in which lithium can more uniformly deposit without forming a dendrite. Such a nano-structure eliminates the potential formation of dendrites, which was the most serious problem in conventional lithium metal batteries (commonly used in 1980s and early 1990s before being replaced by lithium-ion batteries). Such a device is herein referred to as a fully surface-controlled (or surface-enabled), lithium ion-exchanging battery.

Sodium Ion Batteries and Sodium Compound-Based Supercapacitors

Aqueous electrolyte-based asymmetric or hybrid supercapacitors with a sodium ion intercalation compound ($NaMnO_2$) as the cathode and activated carbon as the anode were investigated by Qu, et al [Q. T. Qu, Y. Shi, S. Tian, Y. H. Chen, Y. P. Wu, R. Holze, Journal of Power Sources, 194 (2009) 1222]. Similar compounds (sodium birnessite, $Na_x$-$MnO_2$) were used as the electrode materials of another supercapacitor [L. Athouel, F. Moser, R. Dugas, O. Crosnier, D. Belanger, T. Brousse, Journal of Physical Chemistry C 112 (2008) 7270]. At least the cathode in these supercapacitors involves solid state diffusion (intercalation and de-intercalation) of Na ions in a $Na_xMnO_2$ solid. Furthermore, these supercapacitors do not involve exchange of Na ions between the anode and the cathode. They still exhibit relatively low energy densities.

Sodium ion batteries using a hard carbon-based anode (Na-carbon intercalation compound) and a sodium transition metal phosphate as a cathode have been described by several research groups: Zhuo, X. Y. Wang, A. P. Tang, Z. M. Liu, S. Gamboa, P. J. Sebastian, Journal of Power Sources 160 (2006) 698; J. Barker, Y. Saidi, J. Swoyer, US Patent Application US2005/0238961, 2005; J. Barker; M. Y. Saidi, and J. Swoyer, "Sodium Ion Batteries," U.S. Pat. No. 7,759,008 (Jul. 20, 2010 and J. F. Whitacre, A. Tevar, and S. Sharma, "$Na_4Mn_9O_{18}$ as a positive electrode material for an aqueous electrolyte sodium-ion energy storage device," Electrochemistry Communications 12 (2010) 463-466.

However, these sodium-based devices exhibit even lower specific energies and rate capabilities than Li-ion batteries. These conventional sodium-ion batteries require lithium ions to diffuse in and out of a sodium intercalation compound at both the anode and the cathode. The required solid-state diffusion processes for sodium ions in a sodium-ion battery are even slower than the Li diffusion processes in a Li-ion battery, leading to excessively low power densities.

Partially and Fully Surface-Enabled, Metal Ion-Exchanging Battery Devices (not Including Li Ions Alone)

Parallel to our work on the development of surface-controlled lithium ion-exchanging battery devices and lithium super-batteries, we have also conducted diligent research and development on batteries based on the exchange of other types of alkali ions than lithium, and other types of metal ions (such as alkaline-earth metals, transition metals, non-transition metals, such as aluminum, tin, and gallium, etc.). No prior art had anticipated that these non-lithium ions, having vastly different ionic sizes and electron affinity, electronegativity, electrochemical potential, or valency than lithium, could form a redox reaction or chemical complex with any functional group at the cathode or at both the cathode and the anode material. Specifically, no prior art had taught about or suggested that a divalent ion (e.g. $Ca^{+2}$) or trivalent ion (e.g. $Al^{+3}$) could rapidly and reversibly form a redox pair or chemical complex with a surface-borne functional group, such as carbonyl (>=O), on a surface (or edge) of a nano-structured material (e.g., NGP, CNT, or porous disordered carbon) for a battery application. No one had indicated that large ions like $Na^+$, $K^+$, $Ca^{+2}$, $Zn^{+2}$, and $Al^{+3}$ (all larger than $Li^+$ ions) could be exchanged between the anode and the cathode in a fast and reversible manner, with or without intercalation. There had been no previous scientific basis to predict if a super-battery or surface-enabled battery device could be based on these non-lithium ions. Our extensive and in-depth research has led to very surprising, ground-breaking results that are herein reported.

The present invention provides partially or fully surface-enabled, metal ion-exchanging battery devices, based on non-lithium metals such as non-lithium alkali metals (Na, K, Rb, Cs, and Fr), alkaline metals (e.g., Be, Mg, Ca, and Ba), transition metals (e.g., Ti, V, Cr, Mn, Fe, Co, Ni, and Zn), and other metals (e.g. Al, Sn; Pb, etc). The instant application claims surface-enabled battery devices based on non-lithium alkali metal ions (Na, K, Rb, Cs, Fr, and combinations thereof) and their mixtures with Li (but not Li alone). This application also claims surface-enabled battery devices based on alkaline-earth metal ions, transition metal ions, and other types of metal ions that have a suitable electrochemical potential (e.g., not more than 3.0 volts lower than the reference $Li/Li^+$ potential).

SUMMARY OF THE INVENTION

The present invention provides a partially or fully surface-controlled (surface-enabled), metal ion exchanging battery device. Using an alkali ion-exchanging battery device as an example, the alkali ion is selected from sodium (Na), potassium (K), rubidium (Rb), caesium (Cs), francium (Fr), a combination thereof, or a combination of Na and/or K with lithium (Li), but not Li alone. The battery device comprises: (a) a positive electrode (cathode), (b) a negative electrode (anode), (c) a porous separator disposed between the two electrodes, and (d) a metal ion-containing electrolyte in physical contact with the two electrodes, wherein at least one of the two electrodes contains therein a metal ion source prior to the first charge or the first discharge cycle of the battery device and at least the cathode (preferably both) of the two electrodes comprises a first functional or nano-structured material having a metal ion-capturing or metal ion-storing surface. The operation of this device involves no metal ion intercalation in at least the cathode, and preferably in both of the two electrodes.

Additionally, the operation of this device does not involve the formation of a metal oxide (in contrast to that of a metal-air cell) or a metal sulfide (in contrast to that of a lithium-sulfur cell). In general, the operation of this battery device does not involve the introduction of oxygen from outside the device and does not involve the formation of a metal oxide, metal sulfide, metal selenide, metal telluride, metal hydroxide, or metal-halogen compound (e.g., metal chloride, metal iodide, etc). This new generation of energy storage device exhibits a dramatically higher energy density and significantly higher power density than those of conventional supercapacitors, and a dramatically higher power density than that of the conventional lithium-ion battery. Both metal-air and lithium-sulfur cells exhibit strong chemical reactions that are not surface-enabled. They are chemical reaction-limited, extremely slow, and exhibiting power densities even lower than those of conventional lithium-ion cells.

The metal ion is selected from the following groups of metals: (A) alkali metal including sodium (Na), potassium (K), rubidium (Rb), caesium (Cs), francium (Fr), or a combination thereof; (B) alkaline-earth metal including beryllium (Be), magnesium (Mg), calcium (Ca), strontium (Sr), barium (Ba), radium (Ra), or a combination thereof; (C) transition metals; (D) other metals selected from aluminum (Al), gallium (Ga), indium (In), tin (Sn), lead (Pb), or bismuth (Bi); or (E) a combination thereof. The transition metal is preferably selected from scandium (Sc), titanium (Ti), vanadium (V), chromium (Cr), manganese (Mn), iron (Fe), cobalt (Co), nickel (Ni), zinc (Zn), cadmium (Cd), or a combination thereof. These metal elements have a negative electrochemical potential relative to hydrogen, and the difference in electrochemical potential between any of these metals and lithium is no greater than 3.0 volts.

For the purpose of defining the scope of the claims in this patent application, the term "metal ion-exchanging" means that the discharge of the battery device involves metal ions migrating from one electrode (e.g., anode) to the other electrode (e.g. cathode) and that the re-charge of the battery device involves metal ions migrating in the reverse direction (e.g., from the cathode to the anode). The conventional supercapacitors (both symmetric and asymmetric) do not meet this requirement since no ion exchange occurs between the two electrodes.

The term "surface-controlled" or "surface-enabled" means that the interaction between metal ions and an electrode (the capturing or storing of metal ions by an electrode) are essentially limited to surfaces of the electrode, involving no solid state diffusion of metal ions in and out of the bulk of a solid electrode active material (i.e. not requiring intercalation). The interaction is also not limited by the excessively low surface area of an electrode; i.e. not surface area-limited. Conventional lithium-ion, sodium-ion, and potassium-ion batteries do not meet this definition. If only one of the two electrodes (i.e., the cathode) of a battery cell is surface-enabled and also not surface area-limited, the battery device is said to be a partially surface-controlled (partially surface-enabled) device. If both electrodes are surface-enabled and not surface area-limited, the battery device is said to be fully surface-enabled.

For the purpose of further defining the claims in the instant application, the presently claimed surface-enabled or surface-mediated battery device does not include metal-air or metal-oxygen cells wherein the cathode reactions during cell discharge involve a strong reaction of metal ions with oxygen molecules introduced from outside the battery cell, resulting in the formation of a metal oxide (such as $Li_2O$, $Al_2O_3$, and ZnO). In a metal-air cell, the cathode active material (oxygen) is not part of the battery cell. This reaction between metal ions and oxygen is not electrode surface-enabled (i.e. not mediated or enabled by a surface of a cathode active material). This reaction is also essentially irreversible without the assistance of a catalyst and, even with a catalyst, the reversible reaction (re-charging operation) is extremely slow, even slower than that of a conventional lithium-ion battery. Additionally, the operation of the presently invented surface-enabled battery device does not involve melting of an electrode active material (e.g. does not involve melting of sodium or potassium metal), does not use an electro-catalyst (e.g. to catalyze the anode or cathode reaction), does not involve the formation of a metal oxide species, and does not involve the formation of a metal sulfide (e.g. $Li_xS$).

As examples, the presently invented device includes either a partially or a fully surface-controlled (surface-enabled), alkali ion-exchanging battery device. In this instant invention, the alkali ion is selected from sodium (Na), potassium (K), rubidium (Rb), caesium (Cs), francium (Fr), or a combination thereof. By contrast, in our co-pending application [A. Zhamu, "Surface-Controlled, Lithium Ion-Exchanging Energy Storage Device," US Patent Application Submitted on Dec. 22, 2010] and the two slightly earlier applications related to super-batteries [U.S. application Ser. No. 12/806,679 and 12/924,211], lithium ions are the only type of ions being exchanged between an anode and a cathode.

The electrolyte preferably comprises liquid electrolyte or gel electrolyte (including polymer electrolyte) in which metal ions have a high diffusion coefficient. Solid electrolyte is normally not desirable, but some thin layer of solid electrolyte may be used if it exhibits a relatively high diffusion coefficient. The electrolyte preferably comprises an organic electrolyte (e.g. sodium salt dissolved in an organic solvent) or ionic liquid (e.g., sodium-doped ionic liquid). Aqueous electrolyte can be used if the alkali metal source does not contain non-ionized alkali metal. It may be noted that the electrolyte in a surface-enabled device containing a source of a first metal can contain an ion of a second metal different than the first metal. In other words, as examples, a sodium-exchanging battery can have an electrolyte containing ions of lithium, potassium, calcium, zinc, or a combination thereof as a major or minor type of ion being exchanged between an anode and a cathode.

For convenience, sodium (Na) ion is used as a primary type of ions being exchanged between an anode and a cathode, but this is used as an example only and the instant application is not limited to Na ion-based energy storage devices.

A partially surface-enabled, metal ion-exchanging battery is basically a metal ion-based super-battery. Two examples of such a super-battery are given in FIGS. 1(B) and (C). This device is composed of a positive electrode (cathode), a negative electrode (anode), a porous separator disposed between the two electrodes, and a metal ion-containing electrolyte (e.g., sodium ion-based electrolyte) in physical contact with the two electrodes. An electrolyte component, not shown in FIGS. 1(B) and (C), permeates into the anode, cathode, and the pores of the separator. A particularly important feature of the positive electrode is that it preferably comprises a nano-structured functional material (e.g. a chemically functionalized, nano-structured disordered carbon, nano graphene, or carbon nanotube) having a surface-borne functional group that is capable of reversibly reacting with a metal atom or ion, forming a redox pair with a metal atom/ion or forming a chemical complex with a metal atom/ion during the charge and discharge cycles. The surface-borne functional group is at the edge or on the surface of a nano-structured material (e.g., at an edge or on a surface of a graphene sheet). Although there is no limitation on the electrode thickness, the presently invented positive electrode preferably has a thickness greater than 10 μm, more preferably greater than 50 μm, and most preferably greater than 100 μm.

As illustrated in FIG. 1(C) or FIG. 2, and using sodium ion as an example for the type of ions being exchanged between an anode and a cathode, when a super-battery is made (prior to the first discharge cycle, as shown in FIG. 2(A)), a sodium source (e.g., powder or foil of sodium) is implemented between an anode current collector and a separator. During the first discharge, sodium foil or powder is ionized to supply sodium ions that go into the electrolyte (electrolyte being preferably in a liquid or gel state). These ions migrate from the anode, through the separator pores, into the cathode side. This process involves only liquid-state diffusion and, hence, is fast. These ions are captured by functional groups on the surfaces (including edges) of a functional material (preferably a nano-structured material) at the cathode. Capturing of metal ions means allowing the metal ions to reversibly react with a surface functional group (e.g., forming a redox pair with this group or forming a chemical complex with this group), or simply adsorb or deposit onto a surface of this functional or nano-structured material. This would obviate the need for metal ions to enter the bulk of a cathode active material (such a slow solid-state diffusion is required of a conventional alkali ion battery). FIG. 2(B) schematically shows that a majority or all of the sodium ions have been captured on the surfaces at the cathode.

During the subsequent re-charge operation, metal ions (sodium ions in this example) are released from the surfaces of a functional material at the cathode, migrate through the separator pores into the anode zone where no anode active material or functional material exists, only a current collector (FIG. 2(C)). These sodium ions are deposited onto a surface of the current collector. As will be further discussed later, a current collector has a limited surface area (typically $<<1$ $m^2/g$), which may or may not be able to simultaneously accommodate large amounts of alkali ions swarming back from the cathode into the anode all at the same time, particularly in a high current density situation. The re-charge process could become surface area-limited at the anode.

Another partially surface-enabled, alkali ion-exchanging battery (or alkali super-battery) is schematically shown in FIG. 1(B) or FIG. 3. In this device, an alkali ion source is implemented in the anode zone, which is an alkali-containing compound, such as $Na_4Mn_9O_{18}$ and $NaV_{1-x}Cr_xPO_4F$, which are commonly used as a cathode active material (not anode) in a conventional sodium-ion battery. It may be noted that non-porous, typically micron-scaled hard carbon particles are used as the anode active material and either $Na_4Mn_9O_{18}$ [Whitacre, et al] or $NaV_{1-x}Cr_xPO_4F$ [Zhuo, et al] is used as the cathode active material in conventional Na-ion batteries. In contrast, $Na_4Mn_9O_{18}$ or $NaV_{1-x}Cr_xPO_4F$, is used as a sodium source at the anode of the partially surface-enabled battery. Many other types of sodium-containing compound (e.g. $Na_xTi_2O_4$) may be used as a sodium source. In addition, we have also surprisingly observed that conjugated alkali dicarboxylate (e.g., disodium terephthalate, $Na_2C_8H_4O_4$, or di-potassium terephthalate, $K_2C_8H_4O_4$) and alkali rhodizonate (e.g. $Na_xC_6O_6$, x=2-6) can also be used as an alkali source in the presently invented alkali super-battery or partially surface-enabled battery.

As illustrated in FIGS. 3(A) and (B), when the battery device is discharged, the alkali-containing material at the anode releases alkali ions (e.g. $Na^+$ or $K^+$), which migrate (in liquid electrolyte) through separator pores into the cathode zone. These ions are captured at or by the functional surfaces at the cathode and there is no need to undergo solid-state diffusion at the cathode side. When the battery is re-charged, alkali ions are released from the functional surfaces at the cathode and migrate back to the anode side. However, these ions must re-enter the interior of their parent compounds. This could involve some solid-state diffusion at the anode and, hence, this device is referred to as a partially surface-enabled device (only the cathode side is surface-enabled). Again, alkali ions are used as examples of metal ions. The approach herein discussed is not limited to alkali metals.

To illustrate the operational principle of a fully surface-enabled, alkali ion-exchanging battery device (FIG. 4(A)), one may consider a case wherein an alkali source (e.g. small pieces of sodium foil or powder) is implemented between a nano-structured anode (e.g. composed of functionalized graphene sheets) and a porous polymer separator when the battery device is made, and wherein a nano-structured cathode comprises functionalized graphene sheets surrounded by interconnected pores that are preferably meso-scaled (2 nm-50 nm), but can be smaller than 2 nm. Referring to FIG. 4(A)-(C), during the first discharge cycle, alkali foil is ionized to generate alkali ions in the liquid electrolyte. Alkali ions rapidly migrate through the pores of the polymer separator into the cathode side. Since the cathode is also meso-porous having interconnected pores to accommodate liquid electrolyte therein, alkali ions basically just have to sail through liquid to reach a functional group on a surface or edge of a graphene sheet at the cathode. The subsequent surface redox reaction between an alkali ion and a surface-borne functional group (e.g., carbonyl, $>C=O$ illustrated in FIG. 5(C)) is fast and reversible. Because all the steps (alkali ionization, liquid phase diffusion, and surface redox reaction) are fast and no solid-state diffusion is required, the whole process is very fast, enabling fast discharging and a high power density. This is in stark contrast to the conventional lithium-ion battery or sodium-ion battery wherein lithium or sodium ions are required to diffuse into the bulk of a solid cathode particle (e.g., micron-sized lithium cobalt oxide or $Na_4Mn_9O_{18}$ particles at the cathode), which is a very slow process.

In the above example, the discharge process continues until either the alkali foil or powder (an example of a metal ion source) is completely ionized or all the functional groups at the cathode side are exhausted (i.e. each and every group has captured an alkali ion). During re-charge, alkali ions are released from the surface functional groups at the cathode, diffuse through liquid electrolyte, and get captured by surface-borne functional groups at the anode side (or simply get deposited onto a surface of the nano-structured anode material). Again, no solid-state diffusion is required and, hence, the whole process is very fast, requiring a short re-charge time. This is as opposed to the required solid-state diffusion of lithium ions (or sodium ions) into the bulk of graphite particles at the anode of a conventional lithium-ion battery (or a conventional sodium-ion battery). The nano-structured anode having a high specific surface area also provides sufficient surfaces to receive large amounts of alkali ions swarming back from the cathode, enabling simultaneous deposition or capturing of a large flux of ions. Such a nano-structured anode will not be surface area-limited, as opposed to the situation in FIG. 2(C), where only a current collector exists (no nano-structured material at the anode).

Clearly, this battery device provides a very unique platform of exchanging metal ions between an anode and a cathode that requires no solid-state diffusion or intercalation in both electrodes. The process is substantially dictated by the surface reactions (surface ionization, surface deposition, or surface redox reaction), plus the liquid-phase diffusion (all being very fast). Hence, the device is herein referred to as a surface-controlled (or, preferably, surface-enabled or surface-mediated), metal ion-exchanging battery. This is a totally different and patently distinct class of energy storage device than the conventional lithium-ion or sodium-ion battery, wherein solid-state diffusion or intercalation is required at both the anode and the cathode during both the charge and discharge cycles.

This new surface-enabled, metal ion-exchanging battery device is also patently distinct from the conventional supercapacitor that operates on the electric double layer (EDL) mechanism or pseudo-capacitance mechanism. In both mechanisms, no metal ions are exchanged between the two electrodes. In particular, our new battery device is patently distinct from the LBL CNT-based symmetric supercapacitor of Lee, et al [*Nature Nanotechnology*, 5 (2010) 531-537], wherein both the anode and the cathode are ultra-thin CNT structures prepared by the layer-by-layer (LBL) process. This symmetric supercapacitor does not contain an extra alkali source and does not involve exchange of alkali ions between two electrodes. Furthermore, in the report of Lee, et al, the super-battery device containing a lithium foil as the anode does not contain a nano-structured functional material at the anode (as schematically illustrated in FIG. 1(C)). The anode only has a current collector on which the returning lithium ions are deposited during re-charge. This is a surface area-limited case. Lee, et al also discloses a super-battery consisting of a lithium titanate anode (not a source of non-lithium alkali ions) and a LBL CNT cathode.

The presently invented surface-enabled, metal ion-exchanging device (including the alkali ion-exchanging battery device) is also patently distinct from the lithium super-battery as disclosed in two of our earlier applications (U.S. application Ser. No. 12/806,679 and 12/924,211), which do not have a functional material at the anode. The anode side only contains an anode current collector. In the presently invented fully surface-enabled battery device, not only the cathode but also the anode has large amounts of surface areas to allow metal ions to deposit thereon simultaneously, enabling dramatically higher charge and discharge rates and higher power densities. In other words, in a high current density situation (during fast re-charging), great amounts of metal ions swarm into the anode side, each looking for a site to deposit or react onto. The anode current collector alone has only a small amount of surface area available at one time, incapable of accommodating such a high flux of metal ions. By contrast, the huge specific surface area of a nano-structured functional material (e.g., graphene or CNT) is capable of accommodating a huge amount of alkali ions at the same time.

In addition, the uniform dispersion of these surfaces of a nano material (e.g. graphene or CNT) in an electrode also provides a more uniform electric field in the electrode in which metal ions/atoms can more uniformly deposit without forming a dendrite. More surface areas also mean more deposition spots and each spot only has a small quantity of metal atoms, insufficient to form a dangerous dendrite. Such a nano-structure eliminates the potential formation of dendrites, which was the most serious problem in conventional lithium metal batteries.

In this device, preferably at least one of the two electrodes has a functional material having a functional group (e.g., carbonyl) that is capable of reversibly reacting with a metal atom or ion. Preferably, both of the two electrodes have a functional material having a functional group that reversibly reacts or interacts with a metal atom or ion (e.g. to form a surface redox pair or a chemical complex). Preferably, at least one of the two electrodes has a nano-structured functional material having a high specific surface area no less than 10 $m^2/gram$ (preferably >100 $m^2/gram$, more preferably >500 $m^2/gram$, further preferably >1,000 $m^2/gram$, and most preferably >1,500 $m^2/gram$) to store or support metal ions or atoms thereon. More preferably, both electrodes have a nano-structured functional material having a high specific surface area no less than 10 m²/gram (preferably >100 m²/g, more preferably >500 m²/gram, further preferably >1,000 m²/gram, and most preferably >1,500 m²/gram) to store or support metal ions or atoms thereon.

Preferably, the alkali source (as an example of a metal ion source) comprises an alkali metal chip, alkali metal foil, alkali powder, surface-passivated or stabilized alkali metal or metal alloy particles, or a combination thereof. The alkali ion source may be implemented at the anode side before the first discharge procedure is carried out on this battery device. Alternatively, the alkali source may be implemented at the cathode side before the first charge procedure is carried out on this battery device. As another alternative, both the cathode and the anode may be fabricated to contain some alkali ion source during the battery manufacturing process. It is important to note that this solid alkali source provides the majority of the alkali ions that are to be exchanged between the anode and the cathode during the charge-discharge cycles. Although the alkali ion-containing electrolyte naturally provides some of the needed alkali ions, this amount is way too short to enable the battery device to deliver either a high energy density or a high power density. This is why the symmetric supercapacitor of Lee et al (with both the anode and the cathode containing only LBL CNTs, but no additional solid lithium source) performs so poorly in terms of both the energy density and power density [Lee, et al, Nature Nanotechnology, 5 (2010) 531-537]. These were simply no lithium or other alkali ions being exchanged between the cathode side and the anode side.

In the presently invented battery device, at least a functional material (preferably all the functional materials in both electrodes) is (are) selected from the group consisting of:
(a) A nano-structured or porous disordered carbon material selected from a soft carbon, hard carbon, polymeric carbon or carbonized resin, meso-phase carbon, coke, carbonized pitch, carbon black, activated carbon, or partially graphitized carbon;
(b) A nano graphene platelet selected from a single-layer graphene sheet or multi-layer graphene platelet;
(c) A carbon nanotube selected from a single-walled carbon nanotube or multi-walled carbon nanotube;
(d) A carbon nano-fiber, nano-wire, metal oxide nano-wire or fiber, conductive polymer nano-fiber, or a combination thereof
(e) A carbonyl-containing organic or polymeric molecule;
(f) A functional material containing a carbonyl, carboxylic, or amine group; and
(g) Combinations thereof.

Although CNTs are not particularly desired nano-structured materials due to the high costs and other technical issues, CNTs (alone or in combination with other functional or nano-structured material) can still be used in the presently invented surface-controlled alkali ion-exchanging battery.

The functional material in the anode and/or cathode may be selected from the group consisting of Poly(2,5-dihydroxy-1,4-benzoquinone-3,6-methylene) (PDBM), $M_xC_6O_6$ (x=1-3), $M_2(C_6H_2O_4)$, $M_2C_8H_4O_4$ (alkali metal terephthalate), $M_2C_6H_4O_4$ (alkali metal trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof, where M is an alkali metal element. These organic or polymeric materials (molecules or salts) possess functional groups (e.g. carbonyl group) capable of undergoing a reversible and fast redox reaction with an alkali ion or atom. These functional materials tend to have a relatively low electronic conductivity and, hence, preferably the functional material selected from this group is combined with (e.g. chemically bonded or attached to a nano-structured material, such as nano graphene, carbon nanotube, disordered carbon, nano graphite, material selected from nano graphene, carbon nanotube, disordered carbon, nano graphite, metal nanowire, conductive nano-wire, carbon nano-fiber, and polymeric nano-fiber). For instance, both graphene and the constituent aromatic rings of a disordered carbon (soft carbon, hard carbon, activated carbon, carbon black, etc) can have, on their edges or surfaces, functional groups that can react with the matting functional groups on the aforementioned functional materials (e.g. the hydroxyl group on Tetrahydroxy-p-benzoquinone).

Alternatively, a nano-structured carbon material, such as non-functionalized nano graphene, carbon nanotube, porous disordered carbon, or nano graphite, may simply provide a surface upon which lithium atoms can be deposited, e.g. via electrochemical deposition. Non-functionalized surface can still serve as a physical support or substrate for alkali atoms. The mere existence of a nano-structured material, even without a reactive functional group, can still provide a huge amount of supporting surfaces. This non-functionalized surface is the second type of alkali-storing surface in the present context.

The disordered carbon material may be formed of two phases with a first phase being small graphite crystals or stacks of graphene planes and a second phase being non-crystalline carbon and wherein the first phase is dispersed in the second phase or bonded by the second phase. The disordered carbon material may contain less than 90% by volume of graphite crystals and at least 10% by volume of non-crystalline carbon.

The functional materials may comprise nano graphene selected from a single-layer graphene sheet or a multi-layer graphene platelet. Alternatively, the functional materials may comprise single-walled or multi-walled carbon nanotube. In the battery device, at least one of the functional materials is a nano-structured material having a specific surface area of at least 100 m²/g, preferably at least 500 m²/g, and more preferably at least 1,000 m²/g, and most preferably at least 1,500 m²/g.

Preferably, at least one of the functional materials has a functional group selected from the group consisting of —COOH, =O, —NH₂, —OR, and —COOR, where R is a hydrocarbon radical.

The alkali ion source may be selected from alkali metal (e.g., in a thin foil or powder form, preferably stabilized or surface-passivated), an alkali metal alloy, a mixture of alkali metal or alkali alloy with an alkali intercalation compound, an alkali-bearing compound, alkali titanium dioxide, alkali titanate, alkali manganate, an alkali-transition metal oxide, $Na_xTi_yO_z$, or a combination thereof. Specifically, the alkali intercalation compound or alkali-bearing compound may be selected from the following groups of materials:
(a) Alkali alloyed or intercalated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;
(b) Alkali-doped or alkali-intercalated intermetallic compounds of Si, Ge, Sn, Pb, Sb, Bi, Zn, Al, Ti, Co, Ni, Mn, Cd, and their mixtures;

(c) Alkali-doped or alkali-intercalated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, and
(d) Alkali salts.

The electrolyte may be selected from any of the electrolytes used in conventional sodium-ion batteries or alkali ion-containing salts dissolved in a solvent. The electrolyte may comprise an alkali salt-doped ionic liquid. In the battery device, the positive electrode preferably has a thickness greater than 5 µm, preferably greater than 50 µm, and more preferably greater than 100 µm.

Quite surprisingly, the battery device provides an energy density that is typically no less than 100 Wh/kg, but can reach >500 Wh/kg (based on the electrode weight). This is significantly higher than the energy density (25 Wh/kg based on an electrode weight, or 5 Wh/kg based on the cell weight) of conventional supercapacitors. The power density can reach a level >>100 Kw/kg, also based on an electrode weight. More typically, the battery device provides an energy density greater than 200 Wh/kg and power density greater than 50 Kw/kg. In many cases, the battery device provides an energy density greater than 300 Wh/kg. In some cases, the power density is significantly higher than 100 Kw/kg, or even higher than 200 Kw/kg, which is orders of magnitude higher than the power densities (0.5 Kw/kg) of conventional lithium-ion batteries and is even significantly higher than those (1-10 Kw/kg) of conventional supercapacitors.

BRIEF DESCRIPTION OF THE DRAWINGS

FIG. 1 (A) a prior art lithium-ion battery or sodium-ion cell using graphite or hard carbon as an anode active material and lithium iron phosphate or sodium manganese oxide ($Na_4Mn_9O_{18}$) as a cathode active material; (B) an alkali super-battery cell (partially surface-enabled battery) with a sodium manganese oxide ($Na_4Mn_9O_{18}$) as an anode active material and a cathode made of a functional material (e.g., functionalized nano graphene, CNT, or disordered carbon powder); (C) another type of alkali super-battery cell with an anode of alkali foil or powder (but no nano-structured functional material) and a cathode made of functionalized graphene, CNT, or disordered carbon; (D) an example of the fully surface-enabled, alkali ion-exchanging battery device, which contains a nano-structured functional material (with or without a functional group capable of reacting with alkali ions or atoms) at the anode, an alkali source (e.g. alkali foil or surface-passivated alkali powder), a porous separator, liquid or gel electrolyte (liquid being preferred), a nano-structured functional material at the cathode.

FIG. 2 (A) The structure of a partially surface-enabled, alkali ion-exchanging battery device when it is made (prior to the first discharge or charge cycle), containing an anode current collector (but no nano-structured functional material) at the anode side, an alkali source (e.g. alkali foil or surface-stabilized alkali powder), a porous separator, liquid electrolyte, a nano-structured functional material at the cathode; (B) The structure of this battery device after its first discharge operation (alkali is ionized with the alkali ions diffusing through liquid electrolyte to reach surface-borne functional groups in the nano-structured cathode and rapidly react with these groups); (C) The structure of this battery device after being re-charged (alkali ions are released from the cathode surface, diffusing through liquid electrolyte to reach a surface of a current collector).

FIG. 4 (A) The structure of a fully surface-enabled, alkali ion-exchanging battery device when it is made (prior to the first discharge or charge cycle), containing an anode current collector and a nano-structured functional material at the anode side, an alkali source (e.g. alkali foil or surface-stabilized alkali powder), a porous separator, liquid electrolyte, a nano-structured functional material at the cathode; (B) The structure of this battery device after its first discharge operation (alkali is ionized with the alkali ions diffusing through liquid electrolyte to reach surface-borne functional groups in the nano-structured cathode and rapidly react with these groups); (C) The structure of this battery device after being re-charged (alkali ions are released from the cathode surface, diffusing through liquid electrolyte to reach surface-borne functional groups in the nano-structured anode and rapidly react with these groups). If the nano-structured anode does not have functional groups to capture the returning alkali ions, at least the huge surface areas can still serve as a supporting substrate onto which massive amounts of alkali ions can electro-deposit concurrently. Such a massive, simultaneous deposition cannot be accomplished with the anode current collector alone which typically has a low specific surface area.

FIG. 6 (A) Schematic of a soft carbon, wherein neighboring stacks of graphene sheets or small aromatic rings are favorably oriented with respect to each other at a small angle that is conducive to the growth or merging (graphitizable); (B) hard carbon (non-graphitizable); (C) carbon black, having a large number of small aromatic ring domains arranged to form a nano-scaled spherical particle; and (D) an individual carbon black particle that has been activated to open up small gates that enable liquid electrolyte to access the edge- or surface-borne functional groups inside a particle.

DESCRIPTION OF THE PREFERRED EMBODIMENTS

Figures 3A, 3B:
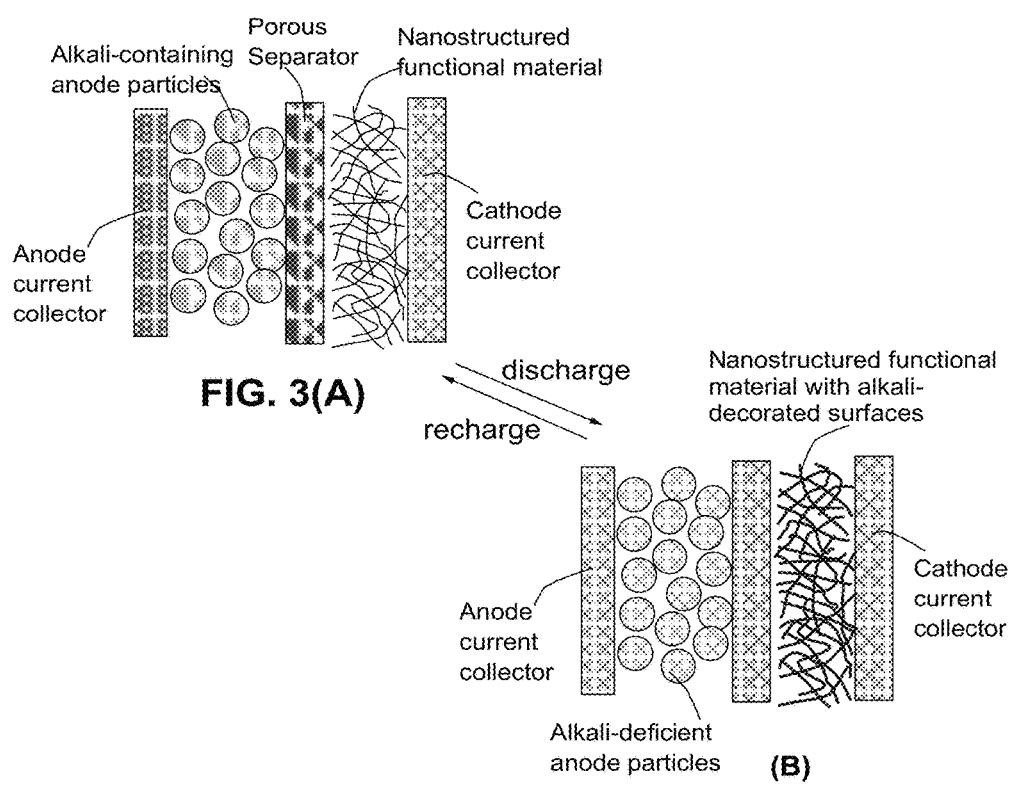
FIG. 3 (A) The structure of another partially surface-enabled, alkali ion-exchanging battery device when it is made (prior to the first discharge or charge cycle), containing an anode current collector and an alkali intercalation compound (as an alkali source) at the anode side, a porous separator, liquid electrolyte, a nano-structured functional material at the cathode; (B) The structure of this battery device in a discharged state where alkali ions were released from the anode, diffusing through liquid electrolyte to reach surface-borne functional groups in the nano-structured cathode and rapidly react with these groups.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting the claimed invention.

This invention provides an electrochemical energy storage device that is herein referred to as a surface-enabled, metal ion-exchanging battery. This device exhibits a power density significantly higher than the power densities of conventional supercapacitors and dramatically higher than those of conventional lithium ion batteries. This device also exhibits an energy density comparable to that of a battery, and significantly higher than those of conventional supercapacitors.

The present invention provides a partially or fully surface-enabled, metal ion-exchanging battery device. The fully surface-enabled, ion-exchanging battery is composed of a positive electrode containing a functional material having a metal ion-storing or metal ion-capturing surface (the functional material being preferably nano-structured with nano-scaled or meso-scaled pores), a negative electrode containing a functional material having a metal ion-storing or metal ion-capturing surface (preferably nano-structured with nano-scaled or meso-scaled pores), a porous separator disposed between the two electrodes, and a metal ion-containing electrolyte in physical contact with the two electrodes. A particularly desirable feature of the negative electrode (anode) and/or the positive electrode (cathode) is that the electrode comprises a chemically functionalized material (e.g., nano graphene, carbon nanotube, porous disordered carbon particles, etc) having a functional group that is capable of rapidly and reversibly reacting with a metal atom or ion during the charge and discharge cycles.

In a partially surface-enabled, alkali ion-exchanging battery device as an example (e.g. as illustrated in FIG. 1(C) and FIG. 2), the anode side contains an alkali ion source (e.g. foil or powder of sodium or potassium) when the battery is made, but no nano-structured functional material (only a current collector exists to receive the alkali ions returning from the cathode during a re-charge operation). All other features are similar to those in a fully surface-enabled counterpart. In other words, the metal ion-exchanging battery is composed of a positive electrode containing a functional material having an alkali ion-storing or alkali ion-capturing surface (the functional material being preferably nano-structured with nano-scaled or meso-scaled pores). In particular, the cathode comprises a chemically functionalized material (e.g., nano graphene, carbon nanotube, porous disordered carbon particles, etc) having a functional group that is capable of rapidly and reversibly reacting with an alkali atom or ion residing in electrolyte during the charge and discharge cycles.

In another partially surface-enabled battery device (e.g., as schematically illustrated in FIG. 1(B) and FIG. 3), the anode comprises an alkali intercalation compound (e.g., $Na_4Mn_9O_{18}$, $NaV_{1-x}Cr_xPO_4F$, or $Na_xTi_2O_4$, which are preferably in a nano particle form). Alternatively, the anode may comprise an anode active material (e.g. un-treated solid hard carbon containing no meso-pores) plus an alkali ion source, wherein the anode active material requires intercalation or solid state diffusion of alkali ions. In other words, the anode side is not surface-enabled, only the cathode side is.

Although there is no limitation on the electrode thickness, the presently invented positive electrode preferably has a thickness greater than 5 μm, more preferably greater than 50 μm, and most preferably greater than 100 μm.

Theoretical Aspects (Alkali Ion Diffusion Kinetics of Conventional Sodium-Ion Batteries and the New Surface-Enabled, Alkali Ion-Exchanging Battery Devices)

Not wishing to be constrained by any theory, but we would like to offer the following theoretical considerations that perhaps are helpful to the readers. We will provide some insight as to how partially and fully surface-enabled alkali ion-exchanging battery devices operate, and why such batteries exhibit exceptional power densities un-matched by conventional lithium-ion and sodium-ion batteries. The power densities of these surface-enabled devices are even surprisingly higher than those of conventional supercapacitors. We will also shed some light on why the electrode thickness of alkali batteries (including partially and fully surface-enabled and conventional sodium-ion batteries) plays such a critical role in dictating the power density in such a dramatic manner.

The internal structure of a conventional sodium-ion battery may be schematically shown in FIG. 1(A). In a battery discharge situation, sodium ions must diffuse out of an anode active material particle, such as non-porous hard carbon solid particles (particle diameter=$d_a$ and the average solid-state diffusion distance=$d_a/2$), and then diffuse in liquid electrolyte across the anode thickness (anode layer thickness=La and the average diffusion distance=La/2). Subsequently, sodium ions must move (in liquid electrolyte) across a porous separator (thickness=Ls), diffuse across part of the cathode thickness (thickness=Lc) in liquid electrolyte to reach a particular cathode active material particle (average diffusion distance=Lc/2), and then diffuse into the bulk of a particle (diameter=$d_c$ and the average solid-state diffusion distance required=$d_c/2$). In a re-charge situation, the sodium ions move in the opposite direction, but must travel approximately the same distances. It may be noted that, in general, diffusion through a liquid is fast and diffusion through a solid is slow. The differences in diffusion rates are one important factor that differentiates the new battery device from the conventional sodium ion battery.

Assume that the diffusion coefficient of sodium ions in a particular medium is D and a required travel distance is x, then the required diffusion time will be $t \sim x^2/D$, according to a well-known kinetics equation. As a first-order of approximation, the total required time scale for a sodium ion to complete a charge or discharge process may be given as:

$$t_{total} = (La/2)^2/D_{electrolyte} + (d_a/2)^2/D_a + (Ls)^2/D_s + (Lc/2)^2/D_{electrolyte} + (d_c/2)^2/D_c \quad (1)$$

where $D_{electrolyte}$=Na ion diffusion coefficient in electrolyte, $D_a$=Na ion diffusion coefficient in an anode active material particle, A=Na ion diffusion coefficient through a porous separator, and $D_c$=Na ion diffusion coefficient in a cathode active material particle.

Representative diffusion coefficients of $Na^+$ in or through various liquid mediums or solid membrane or particles are given below (based on open literature data and our best estimates): liquid electrolyte ($2 \times 10^{-6}$ $cm^2/s$); separator ($7.5 \times 10^{-7}$ $cm^2/s$); $Na_4Mn_9O_{18}$ ($2 \times 10^{-12}$ $cm^2/s$); $NaV_{1-x}Cr_xPO_4F$ ($10^{-13}$ to $10^{-10}$ $cm^2/s$); and hard carbon anode ($3 \times 10^{-11}$ $cm^2/s$).

Figure 8A:
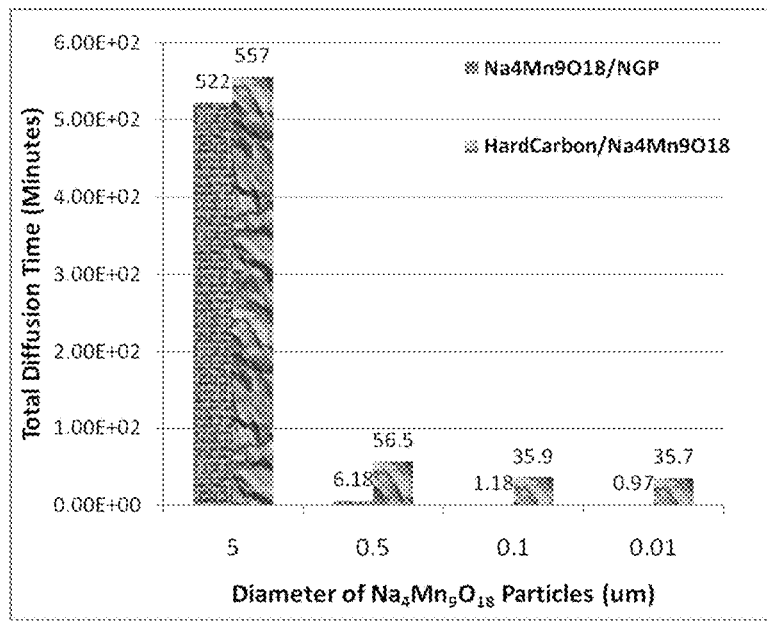
FIG. 8 (A) Estimated total diffusion times plotted as a function of the $Na_4Mn_9O_{18}$ particle size for a partially surface-enabled device (with $Na_4Mn_9O_{18}$ being implemented at the anode side as a sodium ion source and NGP as a nano-structured cathode) and a conventional sodium-ion battery (having non-porous hard carbon as the anode active material and $Na_4Mn_9O_{18}$ as the cathode active material); and (B) Estimated total diffusion times plotted as a function of the nano-structured cathode thickness for another partially surface-enabled battery device (Na Foil/f-CNT with a 20-μm Na foil zone and a 50-μm separator).

This implies that, for a conventional sodium-ion battery cell wherein $Na_4Mn_9O_{18}$ particles are used as a cathode active material and solid hard carbon (HC) particles (untreated, non-porous, and not a type of the nano-structured disordered carbon in the present context), second term, $(d_a/2)^2/D_a$, and the final term, $(d_c/2)^2/D_c$, in Eq. (1) dictate the required total diffusion time due to the excessively low solid-state diffusion coefficients. As illustrated in FIG. 8(A), the total diffusion time for sodium ions to migrate from the anode active material to the cathode active material varies between 35.7 and 557 minutes if the diameter of $Na_4Mn_9O_{18}$ particles increases from 0.01 μm (10 nm) to 5 μm.

By contrast, if the same $Na_4Mn_9O_{18}$ particles are used as a sodium source at the anode and functionalized graphene (f-NGP) is used as the nano-structured cathode material in a sodium super-battery or partially surface-enabled sodium ion-exchanging battery, the required diffusion times are reduced to less than 1 minute (if particle diameter is 0.01 μm), as opposed to 35.7 minutes. If the diameters of the $Na_4Mn_9O_{18}$ particles are maintained at 0.5 μm or smaller, the total diffusion time can be below 7 minutes. This implies that the required battery re-charge time is much shorter than 10 minutes, which conventional lithium-ion or sodium ion batteries thus far have not been able to achieve.

In this type of sodium ion super-battery, the cathode is a meso-porous structure of a functionalized nano carbon material (e.g., graphene, CNT, or disordered carbon), but $Na_4Mn_9O_{18}$ particles constitute the anode (schematically illustrated in FIG. 1(B)). In a battery discharge situation, sodium ions must diffuse out of $Na_4Mn_9O_{18}$ particles, and then diffuse in liquid electrolyte across the anode thickness. Subsequently, sodium ions must move (in liquid electrolyte) across a porous separator, diffuse across part of the cathode thickness in liquid electrolyte to reach a particular surface-borne functional group of a nano-structured cathode active material. There is no need to undergo solid-state diffusion at the cathode side. The whole process is essentially dictated by the solid-state diffusion at the anode.

Figure 8B:
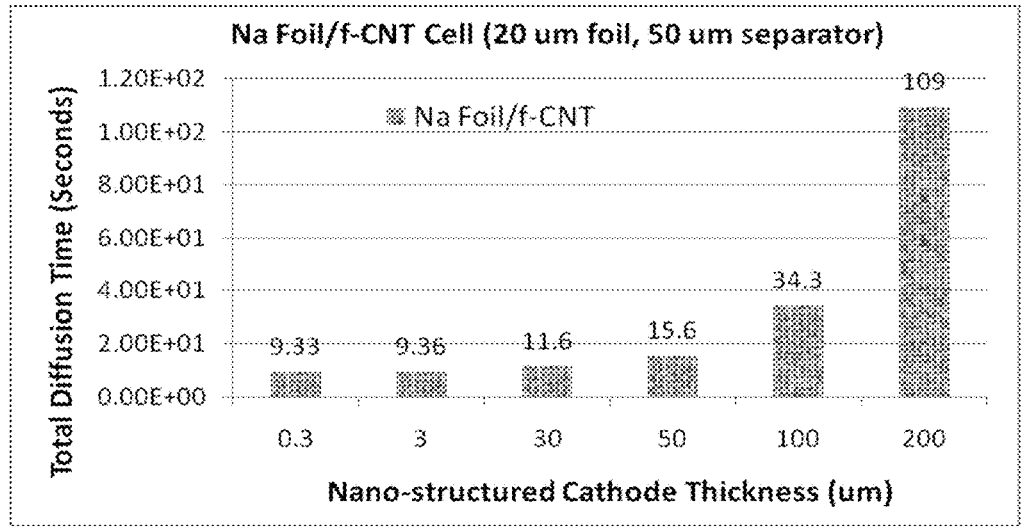

The required diffusion times are even shorter if the anode contains a 20-μm thick sodium foil (or some sodium powder) as a sodium ion source disposed between a current collector and a porous separator layer 50 μm in thickness, and the cathode is composed of a nano-structured, functionalized CNT or NGP material. As illustrated in FIG. 8(B), such a partially surface-enabled, sodium ion-exchanging battery would require a diffusion time as short as 109 seconds (<2 minutes) when the cathode thickness is 200 μm. If the cathode thickness is reduced to 3 μm, the diffusion time is further reduced to 9.36 seconds.

In this type of sodium ion super-battery (partially surface-enabled battery) containing a meso-porous cathode of a functionalized nano carbon material (e.g., graphene, CNT, or disordered carbon) and a sodium metal foil as the anode (schematically illustrated in FIG. 1(C)), Na ions do not have to diffuse through a solid-state cathode particle and, hence, are not subject to the limitation by a low solid-state diffusion coefficient at the cathode (e.g. $10^{-13}$-$10^{-11}$ $cm^2/s$ in a sodium-transition metal oxide particle). Instead, the presently invented nano-structured cathode active materials are highly porous, allowing liquid electrolyte to reach the interior of the pores where the functional groups are present to readily and reversibly react with sodium ions that diffuse into these pores through a liquid medium (not a solid medium) with a high diffusion coefficient (e.g., $2 \times 10^{-6}$ $cm^2/s$). In such a sodium super-battery, the final term, $(d_c/2)^2/D_c$, in Eq. (1) is practically non-existing. The required total diffusion time is now dictated by the thicknesses of the electrodes and the separator. The above discussion is based on the premise that the reversible reaction between a functional group and a sodium ion in the electrolyte is fast, and the whole charge-discharge process is not reaction-controlled.

Several significant observations can be made from the data of FIG. 8(A), 8(B), 9(A), 9(B) and related calculations:
  (1) Conventional sodium ion batteries featuring a micron-sized solid hard carbon particle anode (diameter=5 μm) and a micron-sized $Na_4Mn_9O_{18}$ (particle diameter=5 μm) with an electrode thickness of 100 μm would require 9.28 hours to complete the required sodium ion diffusion process. This is why conventional sodium ion batteries exhibit very low power densities (typically 100-500 W/Kg).

(2) In contrast, for one type of sodium super-batteries featuring a functionalized carbon cathode (e.g. f-CNT, f-NGP, or porous f-disordered carbon) and an anode of $Na_4Mn_9O_{18}$ nano particles (100 nm), the required diffusion times is 70 sec (<1.2 minutes) for a cathode thickness of 100 µm. This is 30-fold faster than the conventional sodium-ion batteries with the cathode particles having a diameter of 100 nm (diffusion time=36 minutes).

(3) For the partially surface-enabled sodium super-batteries, the electrode thickness and separator thickness are two dominating factor. For instance, in the case of using sodium metal foil as the anode (foil thickness=20 µm), the total diffusion time can be as short as <10 sec (when the cathode thickness is 0.3 µm or 3 µm and separator thickness is 50 µm), which increases to 109 sec (still less than 2 minutes) when the cathode thickness is 200 µm (FIG. 9(A)). If the separator thickness can be reduced to 10 µm and the cathode thickness reduced to 3 µm, the required diffusion time would be 1.33 seconds. The diffusion time would be further reduced to 0.6 sec if the sodium foil thickness at the anode is reduced to 10 µm. Such a short response time is unheard of even for conventional supercapacitors that are noted for their fast response and, hence, high power densities.

Figure 9A:
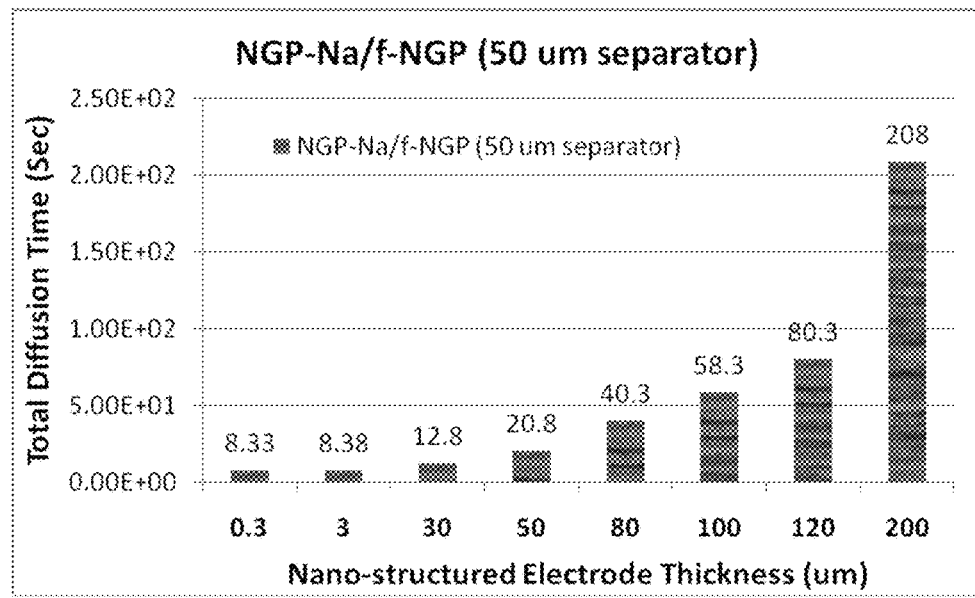
FIG. 9 (A) Estimated total diffusion times plotted as a function of the nano-structured electrode thickness for a fully surface-enabled cell (NGP-Na/f-NGP, 50-μm separator) and (B) Those for a fully surface-enabled cell (10-μm separator).
Figure 9B:
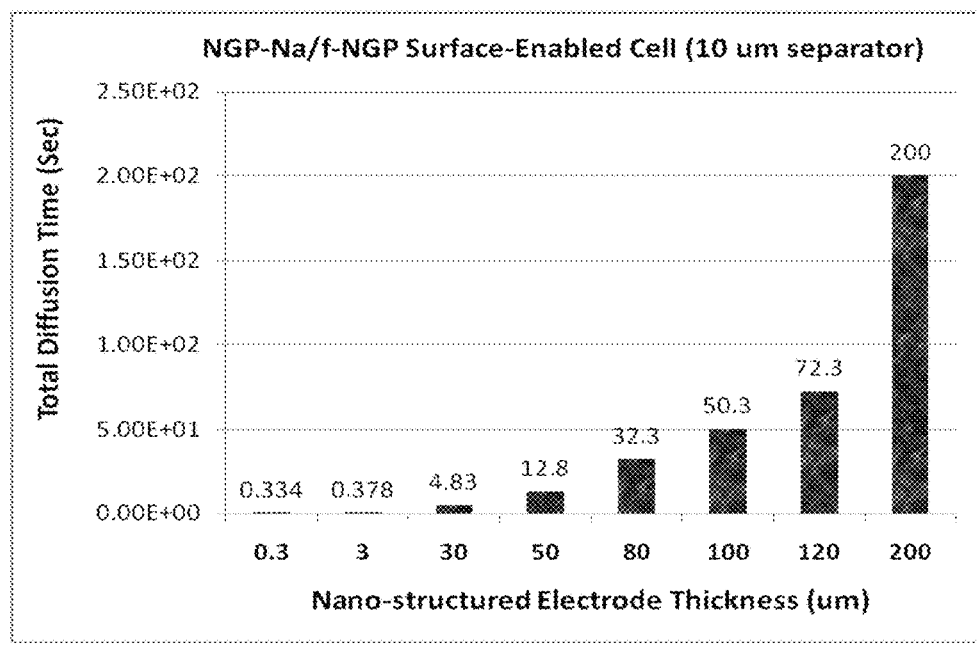

(4) As illustrated in FIG. 9(B), for a fully surface-enabled battery with a 10-µm separator, 10-µm sodium source, 10-µm nano-structured anode, and 10-µm nano-structured cathode, the required diffusion time would be less than 0.4 seconds.

(5) The above observations imply that the sodium super-batteries should have an extraordinary power density, particularly when the electrodes are ultra-thin.

It may be noted that the above calculations for the super-batteries (partially surface-enabled devices) containing a sodium foil as the anode are applicable to the fully surface-enabled battery device as well, with the exception that the sodium foil thickness may be replaced with the thickness of a nano-structured anode in the calculation. The sodium source (sodium particles or pieces of sodium foil) would not add additional anode thickness value in the calculations of the required diffusion times since the nano-structured anode is "elastic" or compressible. The sodium foil may be compressed against the nano-structured anode, or the sodium particles may be incorporated in the nano-structured anode when the battery device is made. Once sodium particles or foil are ionized during the first discharge cycle, the nano-structured anode (e.g. NGP or CNT-based mat) would snap back to touch the separator. Based on the above calculations, the required diffusion times for the super-battery (partially surface-enabled) and those for the fully surface-enabled battery should be approximately the same. Then, why would the fully surface-enabled battery possibly be better than the partially surface-enabled super-battery with a sodium foil alone as the anode (without the nano-structured CNT or NGP)?

The answer is related to the surface area of the electrode (particularly the anode). The above-described calculations of the required diffusion times are based on the assumption that the electrodes have sufficient surface areas to capture large amounts of sodium ions concurrently or within a very short period of time, particularly in a high charge/discharge rate or high current density demand situation, further explained below:

Fully Surface-Enabled Battery Device Versus Partially Surface-Enabled Battery

It may be noted that, for the first type of sodium super-battery or partially surface-enabled sodium ion-exchanging battery (Na foil/f-CNT) where the anode is a sodium foil, there is no anode particle and, hence, no particle diameter ($d_a$ was assigned as zero in the above calculation). During the first discharge, Na foil is electrochemically ionized to release sodium ions. In the above calculations, this surface-mediated reaction was assumed to be fast and not rate-limiting. In reality, this surface reaction can become rate-limiting when a high discharge rate is required (i.e. when the external circuit or load demands a high current density). This limitation may not be controlled by the surface ionization rate itself, but instead by the limited amount of surface area of the lithium foil during the first discharge cycle. In other words, at a given moment of time during the first discharge, there is only so much surface area from which sodium ions can be released simultaneously.

Additionally, during the re-charge cycle, sodium ions move back from the cathode to the anode side, trying to re-deposit onto a surface of the anode current collector (e.g. a copper foil), which is the only surface available at the anode of a super-battery. There are two serious issues associated with using a current collector alone to accommodate the in-flux of sodium ions during re-charge:

(1) If the re-charge rate is high (with a high current density), the huge numbers of sodium ions that rapidly migrate back to the anode side are all trying to deposit simultaneously onto the surface of a current collector, which typically has a very low surface area (specific surface area typically $<<1$ $m^2/g$). This limited surface area could become deposition rate-limiting.

(2) If the re-charge rate is low (with a low current density), the returning sodium ions would find a way to deposit onto the current collector surface in a non-uniform manner. Certain favorable spots will receive more deposited sodium atoms first, and these spots could continue to be deposited at a higher rate. Such a non-uniform sodium deposition could lead to the formation of dendrites at the anode, which could grow longer and longer as the number of cycles increases, and eventually penetrate through the separator to reach the cathode side, causing internal shorting. This possibility could pose a similar problem that plagued the lithium metal battery industry in late 1980s and eventually resulted in the termination of essentially all the lithium metal cell productions in early 1990s. We would not want to see this potential internal shorting problem lead to the same disastrous result for sodium ion-based batteries.

After an extensive and in-depth study, the applicants have solved these two critical issues by implementing a nano-structured anode between an anode current collector and a porous separator. This nano-structured anode is preferably composed of a nano carbon material having a high specific surface area, such as the nano graphene platelet (NGP, single-layer graphene or multi-layer graphene), carbon nano-tube (single-walled or multi-walled), carbon nano-fiber (vapor-grown, electro-spun polymer derived, etc), porous disordered carbon, metal nano-wire, conductive nano-wire, etc. The specific surface area of this nano-structured anode is preferably greater than 100 $m^2/g$, more preferably greater than 500 $m^2/g$, further preferably greater than 1,000 $m^2/g$, and most preferably greater than 1,500 $m^2/g$. This nano-structured material preferably has a functional surface having thereon a functional group that reversibly reacts with an alkali atom or ion (e.g., sodium atom or ion), alkaline-earth metal, transition metal, and other metal ions (e.g. Al).

It is very surprising for us to observe that the implementation of this nano-structured anode significantly increases not only the power density (Kw/Kg), but also the energy density (Wh/Kg) of the presently invented surface-enabled, metal ion-exchanging battery device. We were really very surprised to observe these highly significant observations (presented in the Examples of this specification). Not wishing to be limited by the theory, but we believe that this newly implemented nano-structured anode plays at least the following three roles:

(1) During the re-charge cycle, the massive surface areas of this nano-structured anode enable huge numbers of metal ions to be rapidly deposited simultaneously in a high current density situation (high charge rate). This makes it possible for the battery device to be re-charged in seconds or fractions of a second. This has not been possible with any prior art lithium metal or lithium ion battery, any prior art lithium super-battery, or any prior art sodium-ion battery.

(2) During the first discharge operation of a freshly made surface-enabled battery device of the instant invention, the sodium foil or sodium particles, as examples of an alkali ion source, get ionized, releasing alkali ions at the anode which travel into the cathode side and get captured by the functional material surfaces of the cathode. Upon re-charging, these alkali ions return to the anode and uniformly deposit onto the massive surfaces of the nano-structured anode, forming an ultra-thin coating of alkali metal (possibly mono-layer) thereon. Such a huge surface area of alkali-decorated functional surfaces enables simultaneous release of great amounts of alkali ions during subsequent discharge cycles. This concurrent, massive releasing of alkali ions had not been possible in a battery with an anode current collector alone whose specific surface area is normally much less than 1 $m^2/g$. The high specific surface area of the nano-structured anode, $>>100$ $m^2/g$, enables both fast charging and fast discharging, achieving an unprecedented power density.

(3) The nano-structured anode, electronically connected to a current collector, also provides a uniform electric field in the anode space, allowing the returning metal ions to more homogeneously deposit onto the surface of nano materials (e.g. graphene or CNT). Since huge surface areas are available for this purpose, only an extremely small amount of metal atoms is deposited onto any single spot, insufficient for the growth of a dendrite. These reasons imply that the presently invented surface-enabled battery device is a safer energy storage device.

Surface-Enabled, Sodium Ion-Exchanging Battery Device Versus Prior Art Supercapacitors This new fully surface-enabled, metal ion-exchanging battery device is also patently distinct from the conventional supercapacitor that operates on the electric double layer (EDL) mechanism or pseudo-capacitance mechanism. In both conventional mechanisms, no metal ions are exchanged between the two electrodes. In particular, our new battery device is patently distinct from the LBL CNT-based symmetric supercapacitor of Lee, et al [Nature Nanotechnology, 5 (2010) 531-537], wherein both the anode and the cathode are ultra-thin CNT structures prepared by the layer-by-layer (LBL) process. This symmetric supercapacitor does not contain an extra lithium source or alkali source and does not involve exchange of lithium or alkali ions between the two electrodes.

Examples of Nano-Structured Electrode Materials

Nano-structured materials for use in the anode or cathode of the instant invention may preferably contain nano graphene platelet (NGP), carbon nano-tube (CNT), or nano-structured or porous disordered carbon. These nano-structured carbon materials can be used as a supporting substrate for other organic or polymeric functional materials that have useful functional groups (e.g., carbonyl) but are not electrically conducting. The CNT is a better known material in the nano material industry and, hence, will not be further discussed herein. What follows is a description of NGP and nano-structured disordered carbon:

Nano Graphene Platelet (NGP)

An NGP is a single-layer graphene sheet or a stack of several graphene sheets with each sheet being a hexagonal structure of carbon atoms (single layer being as thin as 0.34 nm or one atom thick). The applicant's research group was the first in the world to discover single-layer graphene [B. Z. Jang and W. C. Huang, "Nano-scaled Graphene Plates," U.S. patent application Ser. No. 10/274,473 (Oct. 21, 2002); now U.S. Pat. No. 7,071,258 (Jul. 4, 2006)] and the first to use graphene for supercapacitor [L. Song, A. Zhamu, J. Guo, and B. Z. Jang "Nano-scaled Graphene Plate Nanocomposites for Supercapacitor Electrodes" U.S. patent application Ser. No. 11/499,861 (Aug. 7, 2006), now U.S. Pat. No. 7,623,340 (Nov. 24, 2009)], and for lithium-ion battery applications [A. Zhamu and B. Z. Jang, "Nano Graphene Platelet-Based Composite Anode Compositions for Lithium Ion Batteries," U.S. patent application Ser. No. 11/982,672 (Nov. 5, 2007), now U.S. Pat. No. 7,745,047 (Jun. 29, 2010)].

For the purpose of defining the geometry of an NGP (including non-oxidized graphene and graphene oxide), the NGP is described as having a length (the largest dimension), a width (the second largest dimension), and a thickness. The thickness is the smallest dimension, which is no greater than 100 nm and, in the present application, no greater than 10 nm (preferably no greater than 5 nm and most preferably single-layer graphene, including graphene oxide, with a thickness of approximately 0.34-1.2 nm). When the platelet is approximately circular in shape, the length and width are referred to as diameter. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (with up to approximately 45% by weight oxygen). Graphene oxide can be thermally or chemically reduced to become reduced graphene oxide (typically with an oxygen content of 1-20%). For use in the anode and/or the cathode of the lithium super-battery, the oxygen content is preferably in the range of 5% to 30% by weight, and more preferably in the range of 10% to 30% by weight.

Figure 7:
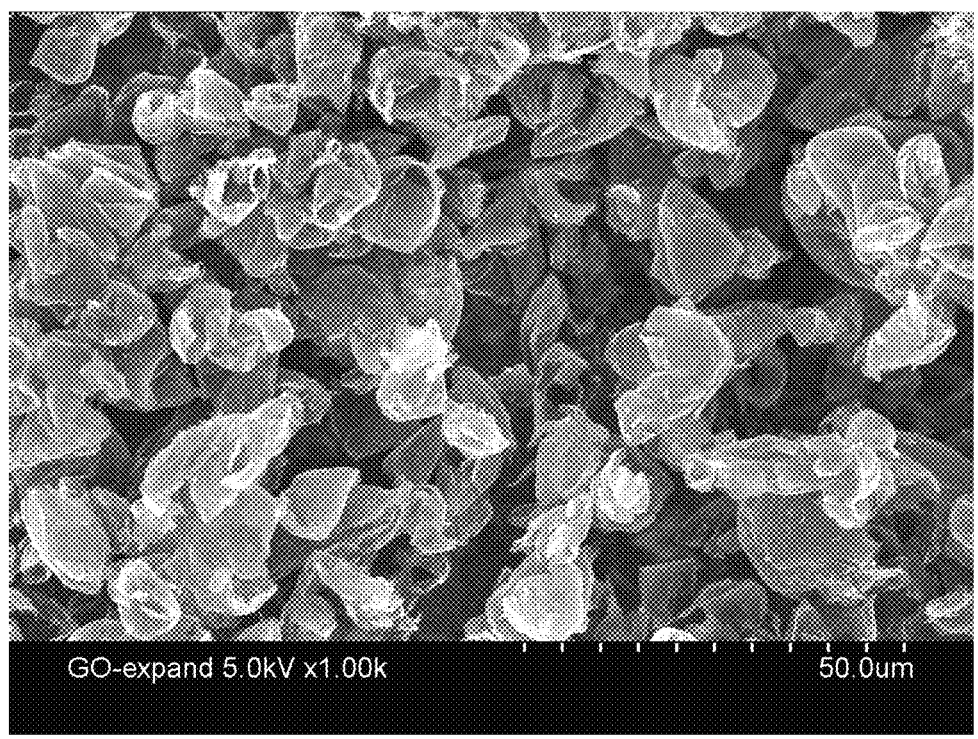
FIG. 7 SEM image of curved graphene sheets (curved NGPs).

Despite the fact that individual graphene sheets have an exceptionally high specific surface area, flat-shaped graphene sheets prepared by conventional routes have a great tendency to re-stack together or overlap with one another, thereby dramatically reducing the specific surface area that is accessible by the electrolyte. FIG. 7 shows a new breed of graphene that is herein referred to as the curved graphene platelet or sheet. Curved NGPs are capable of forming a meso-porous structure having a desired pore size range (e.g. slightly >2 nm) when they were stacked together to form an electrode. This size range allows the commonly used metal ion-containing electrolytes to enter the pores between graphene sheets and edges so that the metal ions (sodium ions, calcium ions, zinc ions, aluminum ions, etc) can simply swim through liquid electrolyte to reach and rapidly react/interact with surface-borne functional groups. These surface-borne functional groups are on a graphene plane surface or an edge surface, which is in direct contact with liquid electrolyte. The metal ions are not required to undergo solid-state diffusion (intercalation) in order to be stored in a nano-structured or porous NGP electrode (or released from this electrode) and, hence, such an electrode is said to be surface-mediated or surface enabled.

The curved NGPs may be produced by using the following recommended procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);
(c) dispersing the exfoliated graphite to a liquid medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up graphite worms to form separated/isolated NGPs and/or to help attach desired functional groups to the oxidized NGPs, resulting in the formation of functionalized NGPs. The functionalizing agent may be an amine- or —$NH_2$-containing group, as used in several common curing agents for epoxy resins; and, optionally, (d) aerosolizing the graphene-liquid solution into liquid droplets containing chemically functionalized single or multiple NGPs while concurrently removing the liquid to recover curved NGPs containing desired functional groups. Without the aerosolizing step, the resulting functionalized graphene platelets tend to be flat-shaped.

It may be noted that steps (a) to (b) are the most commonly used steps to obtain exfoliated graphite and graphene oxide platelets in the field. Step (c) is designed for imparting additional functional groups to NGPs. Step (d) is essential to the production of curved graphene sheets. Oxidized NGPs or GO platelets may be chemically reduced to recover conductivity properties using hydrazine as a reducing agent, before, during, or after chemical functionalization.

The carboxylic acids, being environmentally benign, are particularly preferred functionalizing agents for imparting carbonyl or carboxylic groups to NGPs. The carboxylic acid may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n$COOH, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

The NGPs used in the aforementioned electrode may be subjected to the following treatments, separately or in combination, before or after the functionalization operation:
(i) chemically functionalized with a different functional group. Other useful surface functional groups may include quinone, hydroquinone, quaternized aromatic amines, or mercaptans;
(ii) coated or grafted with a polymer that contains a desired functional group (e.g., carbonyl group);
(iii) subjected to an activation treatment (analogous to activation of carbon black materials) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

The above-described processes produce graphene oxide platelets or oxidized NGPs. The heavy oxidation step involved in these processes intrinsically introduces oxygen-containing groups to both the edge surfaces and the basal plane surfaces (top and bottom surfaces) of an NGP. This can be good or bad. On the one hand, we would like to create as many functional groups as possible to maximize the lithium-capturing capacity. But, on the other hand, the functional groups on the basal or graphene plane necessarily inflict damage to the plane and significantly reduce the over-all conductivity of an NGP. The formation of functional groups in this manner, without step (c) above, is not a well-controlled process.

Fortunately, after very diligent research work, we have discovered an alternative way to impart functional groups to NGPs in a more controlled manner. This new way involves producing pristine NGPs without going through the conventional chemical intercalation/oxidation procedure. The produced non-oxidized graphene (naturally having edge surfaces being more chemically active) is then subjected to controlled oxidation or controlled functionalization. We have surprisingly found that functional groups were attached to the edge surfaces first and essentially exhausted the active sites at the edge surfaces before any significant amount of functional groups began to attach themselves to the basal planes.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (Jun. 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production." Once pristine graphene is produced, the material is then exposed to an oxidation or functionalization treatment using, for example, a gaseous-phase or liquid acid or acid mixture. The pristine NGPs may also be immersed in carboxylic acids at a desired temperature for a period of time to obtain NGPs with a desired level of functionalization.

Specifically, the oxidation treatment comprises subjecting the pristine NGP material to an oxidizing agent preferably selected from ozone, sulfonic ($SO_3$) vapor, an oxygen-containing gas, hydrogen peroxide vapor, nitric acid vapor, or a combination thereof. Preferably, the treatment comprises subjecting the pristine NGP material to an oxidizing agent in a hydrogen-containing environment. Although oxidation treatment can be conducted by immersing NGPs in a liquid acid and/or oxidizer environment, such a procedure requires a subsequent water-rinsing and purification step (such a rinsing procedure is not as tedious as required in the case of conventional sulfuric acid-intercalation graphite, nevertheless). Hence, a gaseous treatment requiring no post-treatment rinsing is preferred.

A primary goal of the oxidation treatment is to impart a desired amount of functional groups to pristine NGPs without a significant compromise in electrical conductivity. After an extensive and in-depth study we have come to discover that conductive functionalized NGPs can be produced with an oxygen content no greater than 25% by weight, preferably between 5% and 25% by weight. Presumably, a majority of the functional groups are located at the edge surfaces of NGPs since the electrical conductivity would not be significantly reduced. Beyond 25% of over-all oxygen content, functional groups begin to appear on graphene plane surfaces, interrupting electron-conducting paths. The oxygen contents were determined using chemical elemental analysis and X-ray photoelectron spectroscopy (XPS).

The partially oxidized NGPs prepared according to a preferred embodiment of the present invention can be further functionalized by carrying out an additional step of contacting the partially oxidized NGPs with a reactant so that a functional group is added to a surface or edge of the nano graphene platelet. The functional group may contain alkyl or aryl silane, alkyl or aralkyl group, hydroxyl group, amine group, fluorocarbon, or a combination thereof.

The NGPs, after a partial oxidation treatment, will have a reactive graphene surface (RGS) or reactive graphene edge (RGE). They can be prescribed to undergo the following reactions:

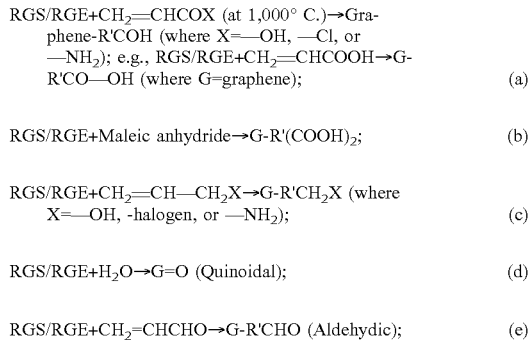

In the above-listed reactions, R' is a hydrocarbon radical (alkyl, cycloalkyl, etc). Partial oxidation of pristine NGPs can lead to the attachment of some functional groups on a surface or at an edge of a graphene plane, including carboxylic acid and hydroxyl groups. A large number of derivatives can be prepared from carboxylic acid alone. For instance, alcohols or amines can be easily linked to acid to provide stable esters or amides.

Any reaction capable of attaching carbonyl (>C=O) or amine (—$NH_2$) group to the graphene edge or basal plane surface may be used for practicing the instant invention.

We have also surprisingly observed that the surface of a graphene sheet, basically made up of a layer of carbon atoms arranged in a hexagonal or honeycomb-like structure, can also allow metal ions to adsorb thereon in a fast and reversible manner. Such a mono-layer of metal atoms (e.g. sodium, calcium, titanium, or aluminum atoms) appears to be sufficiently stable so that metal atom-adsorbed graphene surfaces, if used as an anode active material, would not lead to any significant self-discharge. When used at the cathode, the metal atoms adsorbed thereon can be readily released during the battery re-charging cycle, enabling a fast re-charging.

This ease of releasing metal ions is in sharp contrast to the conventional metal-air or Li—S cells wherein, during re-charge of a battery, the reduction of metal oxide (e.g. lithium oxide) or metal sulfide (e.g., $Li_xS$) is an extremely difficult and slow process even with the assistance of currently the best and most expensive electro-catalysts (e.g., Pt, Pd, etc.). Furthermore, currently, the round trip efficiency of Li-air cells is typically in the range of 30-70% (mostly <50%). By contrast, the round trip efficiency of the presently invented graphene-mediated cell is typically close to 100%. State-of-art Li-air cells can only be used for a small number of cycles (typically <50 cycles), but our surface-enabled devices are capable of cycling for tens or hundreds of thousands of cycles.

Nano-Structured or Porous Disordered Carbon

Figure 5A:
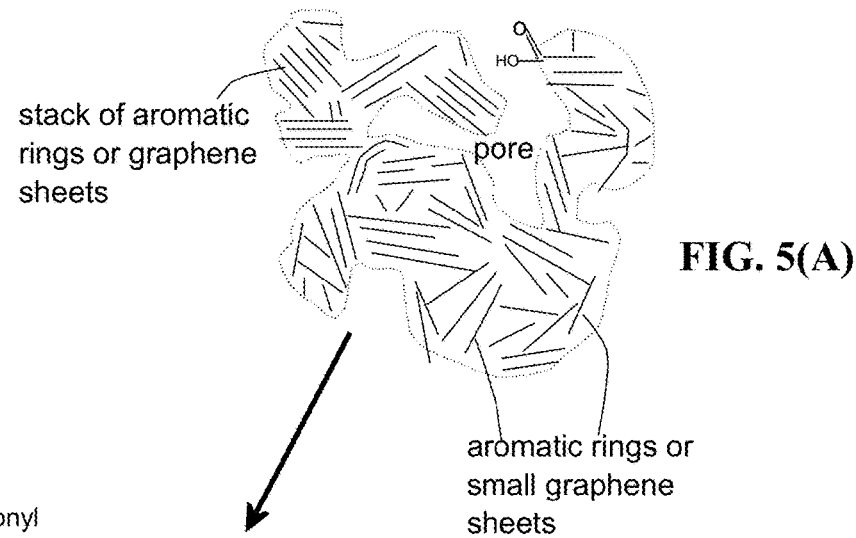
FIG. 5 (A) Schematic of a typical structure of a disordered carbon (as an example of a nano-structured functional material) that is highly porous with pores accessible by liquid electrolyte in such a manner that the functional groups attached to an edge or surface of an aromatic ring or small graphene sheet can readily react with alkali ions; (B) Examples of functional groups capable of reversibly reacting with alkali ions. Alkali ions are not required to enter the interior of a solid particle (no solid state diffusion is necessary), as opposed to a conventional lithium-ion battery wherein lithium ions must diffuse through a narrow channel of a solid compound (e.g., a $LiFePO_4$ particle); and (C) A possible alkali storage mechanism, which is fast, reversible, and stable.
Figure 5B:
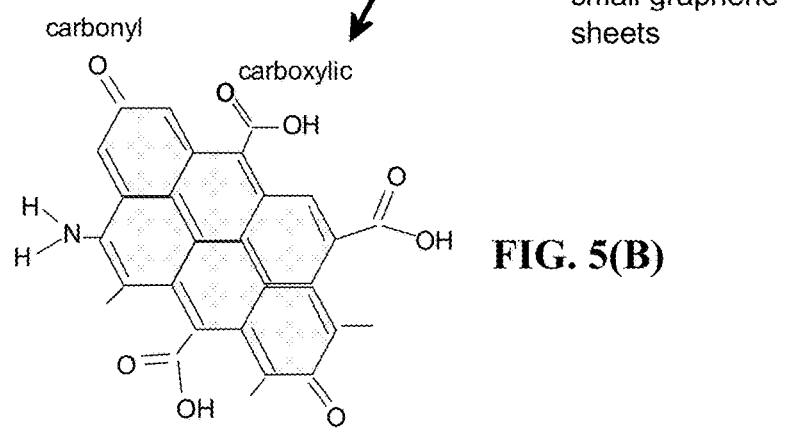

The disordered carbon material may be selected from a broad array of nano-structured or meso-porous carbonaceous materials, such as meso-porous soft carbon, hard carbon, polymeric carbon (or carbonized resin), meso-phase carbon, coke, carbonized pitch, carbon black, activated carbon, or partially graphitized carbon. As schematically illustrated in FIGS. 5(A) and (B), a disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. These graphite crystals and stacks of graphite planes are nano-sized, both in the thickness dimension and often in the lateral dimensions as well. The second phase is made up of mostly smaller molecules, smaller aromatic rings, defects, and amorphous carbon. The desired functional groups (e.g., —COOH, >C=O, and $NH_2$ groups in FIG. 5(B)) are attached to an edge or plane surface of an aromatic ring structure. However, without a special activation or chemical treatment as herein described, solid particles of disordered carbon either do not have pores or have pores that are too small to allow liquid electrolyte to enter the interior of a particle and, hence, the functional groups cannot be accessed by the metal ions residing in electrolyte.

Hence, the disordered carbon must be treated to become highly porous (e.g., activated carbon) or present in an ultra-fine powder form (preferably having a dimension less than 5 nm or having a specific surface area higher than 10 $m^2/g$, preferably higher than 100 $m^2/g$, more preferably higher than 500 $m^2/g$, further preferably higher than 1,000 $m^2/g$, and most preferably higher than 1,500 $m^2/g$). Solid particles of conventional carbon black, soft carbon, and hard carbon, etc, typically require a special activation or chemical treatment to open up the pores (preferably >2 nm in size)

that enable liquid electrolyte to permeate into the interior of these disordered materials, as illustrated in FIG. 6(D). In other words, without these pores (particularly meso-scaled pores, >2 nm), liquid electrolyte would not be able to reach the interior of a particle of carbon black, soft carbon, or hard carbon and the metal ions would not be able to access the surface-borne functional groups that mostly exist inside the particles. In such pore-free situations, metal ions would have to intercalate or diffuse into the bulk of a carbon black particle (this electrode would not be surface-enabled). The nano-structured disordered carbon refers to a disordered carbon material with pores that serve as gates through which liquid electrolyte can access the interior of the material.

Figure 5C:
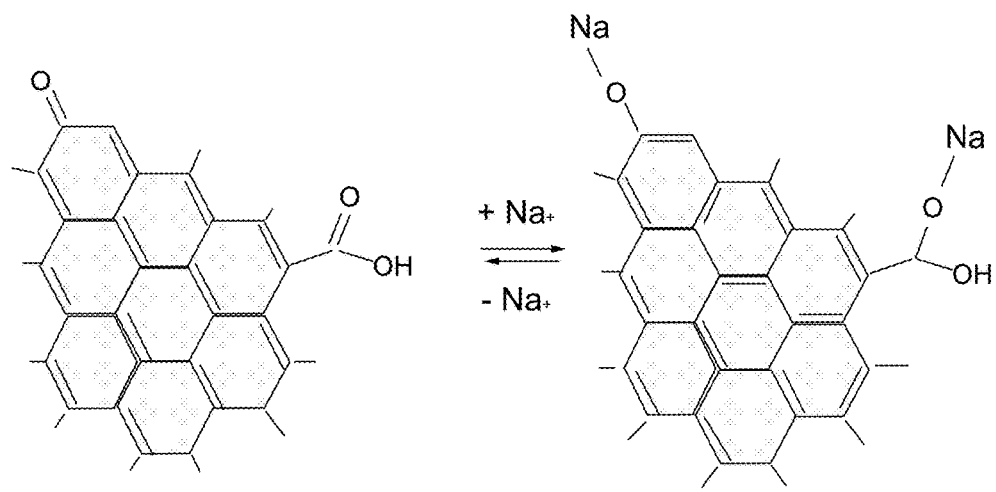

With the gates being open, the porous or nano-structured disordered carbon would have functional groups (FIG. 5(C)) capable of undergoing a surface redox reaction or forming a chemical complex with incoming alkali ions floating in the liquid electrolyte that permeates into the interior of an electrode material particle.

Soft carbon refers to a carbonaceous material composed of small graphite crystals wherein the orientations of these graphite crystals or stacks of graphene sheets are conducive to further merging of neighboring graphene sheets or further growth of these graphite crystals or graphene stacks (FIG. 6(A)) using a high-temperature heat treatment (graphitization). Hence, soft carbon is said to be graphitizable.

Hard carbon (FIG. 6(B)) refers to a carbonaceous material composed of small graphite crystals wherein these graphite crystals or stacks of graphene sheets are not oriented in a favorable directions (e.g. nearly perpendicular to each other) and, hence, are not conducive to further merging of neighboring graphene sheets or further growth of these graphite crystals or graphene stacks (i.e., not graphitizable).

As schematically illustrated in FIG. 6(C), Carbon black (CB), acetylene black (AB), and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc).

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Polymeric carbons can assume an essentially amorphous structure, or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nano-crystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to activation using a process commonly used to produce activated carbon (e.g., treated in a KOH melt at 900° C. for 1-5 hours). This activation treatment is intended for making the disordered carbon meso-porous, enabling chemical functionalizing agents to reach the edges or surfaces of the constituent aromatic rings. The meso-pores will also be accessible to the liquid electrolyte after the battery cell is made. Such an arrangement enables the lithium ions in the liquid to readily react with the functional groups without having to undergo solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce meso-phase particles or spheres.

The functionalized disordered carbon may be produced by using the following recommended procedures (as a preferred embodiment):

(e) Physically or chemically activating a desired disordered carbon (e.g. a soft carbon, hard carbon, polymeric carbon or carbonized resin, meso-phase carbon, coke, carbonized pitch, carbon black, activated carbon, or partially graphitized carbon) to obtain activated disordered carbon that is now porous or nano-structured. For instance, the activation treatment can be accomplished through oxidizing, $CO_2$ physical activation, KOH or NaOH chemical activation, or exposure to nitric acid, fluorine, or ammonia plasma. The main purpose of this treatment is to create pores or open up gates through which liquid electrolyte can enter to reach the interior of a disordered carbon particle, allowing metal ions residing in the liquid electrolyte to reach functional groups inside the nano-structured material. This obviates the need for metal ions to undergo solid-state diffusion (intercalation) and, hence, the metal ion storage in a nano-structured or porous disordered carbon electrode is said to be surface-mediated or surface-enabled.

(f) dispersing the activated disordered carbon to a liquid medium containing a functionalizing agent (e.g., an oxidizing agent such as sulfuric acid, nitric acid, hydrogen peroxide or, preferably, carboxylic acid, formic acid, etc., which is a source of —COOH group) to form a suspension. Stirring, mechanical shearing, or ultrasonication, and/or temperature can be used to break up the activated disordered carbon particles to accelerate the functionalization of disordered carbon. The functionalizing agent may be an amine-(or —$NH_2$-containing group, as used in several common curing agents for epoxy resins), carboxylic groups (—COOH), or other groups capable of reversibly reacting with lithium; and, optionally, (g) aerosolizing the suspension into liquid droplets containing chemically functionalized disordered carbon particles while concurrently removing the liquid to recover functionalized disordered carbon particles.

The functionalizing procedures for nano-structured disordered carbon are similar to those used for NGPs and, hence, will not be repeated here. In particular, any reaction capable of attaching carbonyl (>C=O) or amine (—$NH_2$) group to the graphene edge or basal plane surface of a disordered carbon material may be used for practicing the instant invention.

Organic and Polymeric Functional Materials Containing Metal Ion-Reacting Functional Groups We have surprising found that many organic- or polymer-based functional materials may contain pendant functional groups that are capable of rapidly and reversibly reacting with alkali ions (in addition to lithium ions) in liquid or gel electrolyte. Examples include Poly(2,5-dihydroxy-1,4-benzoquinone-3,6-methylene) (PDBM), $Li_xC_6O_6$ (x=1-3), $Li_2(C_6H_2O_4)$, $Li_2C_8H_4O_4$ (Li terephthalate), $Li_2C_6H_4O_4$(Li trans-trans-muconate), 3,4,9,10-perylenetetracarboxylicacid-dianhydride (PTCDA) sulfide polymer, PTCDA, 1,4,5,8-naphthalene-tetracarboxylicacid-dianhydride (NTCDA), Benzene-1,2,4,5-tetracarboxylic dianhydride, 1,4,5,8-tetrahydroxy anthraquinon, Tetrahydroxy-p-benzoquinone, and combinations thereof. These functional molecules, polymers, or salts normally have a relatively low electronic conductivity making them not amenable to serving as an electrode material by themselves. One exception is sulfur-cross-linked PTCDA (PTCDA sulfide polymer).

Any of these non-conducting functional materials may be preferably combined with (e.g. chemically bonded or attached to) a nano-structured material, such as the NGP, CNT, disordered carbon, nanowire, and nano-fiber. For instance, both graphene and the constituent aromatic rings of a nano-structured disordered carbon (soft carbon, hard carbon, activated carbon, carbon black, etc) can have, on their edges or surfaces, functional groups that can react with the matting functional groups on the aforementioned functional materials (e.g. the hydroxyl group on Tetrahydroxy-p-benzoquinone). Alternatively, these organic or polymeric functional materials may be simply supported on a surface of a nano-structured material (e.g., graphene or nano-wire surface). The nano-structure material (e.g. graphene and disordered carbon) may be functionalized as well so that it provides not only support for the organic or polymeric material (imparting electric conductivity) but also functional groups capable of reacting with alkali ions.

Electrolytes

A wide range of electrolytes can be used for practicing the instant invention. Most preferred are non-aqueous liquid and polymer gel electrolytes although other types can be used. The non-aqueous electrolyte to be employed herein may be produced by dissolving an electrolytic salt of a desirable metal ion or more than one type of ions (e.g. salt of combined $Na^+$ and $K^+$) in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a nano-structured carbonaceous material; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent.

Preferred second solvents are dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent may be selected so that the viscosity of this second solvent is 28 cps or less at 25° C. Actually, these solvents can be used as a primary solvent with or without EC.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC and MB; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved.

The electrolytic salts to be incorporated into a non-aqueous electrolyte may be selected from a lithium salt, sodium salt, potassium salt, calcium salt, magnesium salt, zinc salt, titanium salt, any transition metal salt, aluminum salt, etc. Examples are lithium perchlorate ($LiClO_4$), sodium perchlorate ($NaClO_4$), potassium perchlorate ($KClO_4$), lithium hexafluorophosphate ($LiPF_6$), sodium hexafluorophosphate ($NaPF_6$), potassium hexafluorophosphate ($KPF_6$), transition metal hexafluorophosphate, aluminum hexafluorophosphate ($Al(PF_6)_3$), lithium borofluoride ($LiBF_4$), sodium borofluoride ($NaBF_4$), potassium borofluoride ($KBF_4$), calcium borofluoride ($Ca(BF_4)_2$), aluminum borofluoride ($Al(BF_4)_3$), transition metal borofluoride, alkaline-earth metal borofluoride, lithium hexafluoroarsenide ($LiAsF_6$), other alkali metal hexafluoroarsenides, transition metal hexafluoroarsenides, other metal hexafluoroarsenides, lithium trifluoro-metasulfonate ($LiCF_3SO_3$) and bis-trifluoromethyl sulfonylimide lithium [$LiN(CF_3SO_2)_2$]. Among them, $NaPF_6$, $NaBF_4$, $KPF_6$, $KBF_4$ and $NaN(CF_3SO_2)_2$ are preferably used in a sodium ion- or potassium ion-exchanging battery device. $NaPF_6$, $NaBF_4$, $KPF_6$, and $KBF_4$ are preferably used in a sodium ion- or potassium ion-exchanging battery device. $NaPF_6$, $NaBF_4$, $KPF_6$, and $KBF_4$, and/or an alkaline-earth metal borofluoride are preferably used in an alkaline-earth metal ion-exchanging battery device. $Al(BF_4)_3$, $NaPF_6$, $NaBF_4$, $KPF_6$, and $KBF_4$, are preferably used in an aluminum ion-exchanging battery device, etc. The content of aforementioned electrolytic salts in the non-aqueous solvent is preferably 0.5 to 2.0 mol/l.

The following examples serve to illustrate the preferred embodiments of the present invention and should not be construed as limiting the scope of the invention:

Example 1: NGPs from Sulfuric Acid Intercalation and Exfoliation of MCMBs

MCMB 2528 microbeads (Osaka Gas Chemical Company, Japan) have a density of about 2.24 g/cm$^3$; a median size of about 22.5 microns, and an inter-planar distance of about 0.336 nm. MCMB 2528 (10 grams) were intercalated with an acid solution (sulfuric acid, nitric acid, and potassium permanganate at a ratio of 4:1:0.05) for 24 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 600° C. for 30 seconds to obtain exfoliated graphite. The exfoliated MCMB sample was subjected to further functionalization in formic acid at 25° C. for 30 minutes in an ultrasonication bath to obtain functionalized graphene (f-NGP).

Graphene oxide solution was prepared by immersing natural graphite powder (average particle size <100 μm) in an acid solution (sulfuric acid, nitric acid, and potassium permanganate at a ratio of 4:1:0.05) for 96 hours. The resulting yellow-brown color solution was rinsed and treated using a centrifuge device to remove non-oxidized particles and excess acids and oxidizers. The product was a gel-like solution with graphene oxide polymers dissolved or dispersed in water.

Example 2: Preparation of Nano-Structured, Functionalized Soft Carbon (One Type of Disordered Carbon)

Functionalized soft carbon was prepared from a liquid crystalline aromatic resin. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 5-7. The activated soft carbon (porous and nano-structured) was then immersed in a 90% $H_2O_2$-10% $H_2O$ solution at 45° C. for an oxidation treatment that lasted for 2 hours. Then, the resulting partially oxidized soft carbon was immersed in HCOOH at room temperature for functionalization for 24 hours. The resulting porous, functionalized soft carbon was dried by heating at 60° C. in a vacuum oven for 24 hours.

Example 3: Nano-Structured Soft Carbon-Based Surface-Enabled Alkali Battery Devices Fully surface-enabled coin cells using functionalized soft carbon as a cathode and functionalized soft carbon as a nano-structured anode (plus a small piece of potassium foil as a potassium source implemented between a current collector and a separator layer, Sample-1A) were made and tested. The separator was one sheet of micro-porous membrane (Celgard 2500). The current collector for each of the two electrodes was a piece of carbon-coated aluminum foil. The nano-structured electrode was a porous composite composed of 85 wt. % functionalized soft carbon (+5% Super-P and 10% PTFE binder coated on Al foil). The electrolyte solution was 1 M $KPF_6$ dissolved in a mixture of ethylene carbonate (EC) and dimethyl carbonate (DMC) with a 3:7 volume ratio. The separator was wetted by a minimal amount of electrolyte to reduce the background current. Cyclic voltammetry and galvanostatic charge-discharge measurements of the potassium cells were conducted using an Arbin 32-channel supercapacitor-battery tester at room temperature (in some cases, at a temperature up to 60° C.).

As a reference sample (Sample-1-B), similar coin cells containing a piece of potassium foil as an alkali metal ion source at the anode but without a nano-structured carbon layer were also made and tested. This is a partially surface-enabled alkali ion-exchanging battery.

Figure 10:
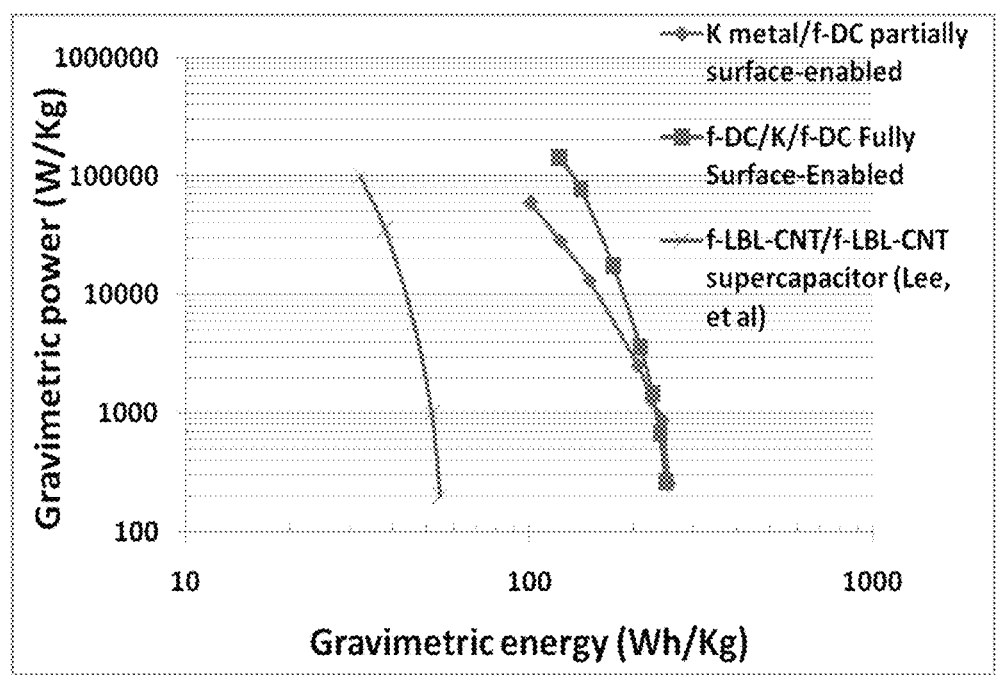
FIG. 10 Ragone plot of a partially surface-enabled, potassium ion-exchanging battery having a functionalized disordered carbon-based cathode and a K source at the anode (with an anode current collector only, no nano-structured anode material) and that of a corresponding fully surface-enabled, potassium ion-exchanging battery device (composed of a disordered carbon anode, a K ion source at the anode, and porous, functionalized disordered carbon cathode). As compared to a prior art LBL-CNT/LBL-CNT symmetric supercapacitor, both devices exhibit significantly higher energy densities.

Galvanostatic charge-discharge studies of the super-battery (Sample-1-B) with such a functionalized soft carbon-based material (thickness >200 μm) as a cathode active material, and those of the corresponding fully surface-enabled battery cell (Sample-1A) have enabled us to obtain significant data as summarized in the Ragone plot of FIG. 10. The data was compared to the data of the prior art symmetric supercapacitor (f-LBL-CNT/f-LBL-CNT) of Lee, et al. This plot allows us to make the following observations:

(a) The fully surface-enabled, alkali ion-exchanging battery device exhibits significantly higher energy densities and power densities than those of the corresponding partially surface-enabled battery under the conditions of relatively high current densities (higher power density data points in the plot). This demonstrates that the presence of a nano-structured anode (in addition to the nano-structured cathode) enables high alkali deposition rates onto the massive surface areas of the anode during the re-charge and high alkali ion release rates from the same massive surface areas during discharge cycles, respectively. During fast charging and fast discharging, the partially surface-enabled battery, having a current collector alone (with a limited specific surface area) at the anode, cannot provide a sufficient amount of surface area for use by the alkali ions that try to deposit onto or release from the limited surface area all at the same time. The whole charge or discharge process can become surface-limited.

(b) The surface-enabled, potassium ion-exchanging battery device exhibits significantly higher energy densities and power densities than those of the prior art supercapacitor composed of a functionalized LBL CNT anode and a functionalized LBL-CNT cathode as described by Lee, et al (the supercapacitor has no potassium foil as an alkali ion source).

(c) As mentioned earlier in the Background section, the power density of a state-of-art supercapacitor is typically of 5,000-10,000 W/Kg, but that of a conventional lithium-ion battery or sodium-ion battery is 100-500 W/kg. The surface-enabled potassium ion-exchanging battery exhibits a power density of 143,500 W/kg (based on single-electrode weight). This gives a power density of approximately 143,500/5=28,700 W/kg (based on the total cell weight). This implies that the presently invented surface-enabled alkali battery device has a power density (or charge-discharge rates) significantly higher than the power density of conventional electrochemical supercapacitors (despite the fact that conventional supercapacitors are noted for their outstanding power densities). Further, the power density of this new device is >56-fold higher than that of a conventional lithium-ion battery. The surface-enabled K ion-exchanging batteries have an energy density of 262/5=52 Wh/kg, based on the total cell weight, which is comparable to that of a modern battery (e.g., Ni metal hydride battery) and is 10 times higher than the energy density of conventional supercapacitors. This is a stunning result and it is no exaggeration to state that this accomplishment is a revolution in the field of energy storage.

The cells of Sample-1A and Samples-1B work on the surface redox reactions of alkali ions with select functional groups on the surfaces/edges of aromatic rings at the cathode side (Sample-1B) and at both the cathode and the anode (Sample-1A). These functional groups, attached to both the edge and plane surfaces of aromatic rings (small graphene sheets), are capable of rapidly and reversibly react with alkali ions.

The surface-enabled alkali ion-exchanging battery of the present invention is a revolutionary new energy storage device that fundamentally differs from a supercapacitor since an electric double layer (EDL) supercapacitor relies on the formation of double layers of charges at the electrode-electrolyte interface. In addition, the supercapacitor does not involve exchange of alkali ions between the anode and the cathode. This surface-enabled battery device also differs from conventional lithium-ion or alkali-ion batteries wherein lithium or alkali atoms (or ions) intercalate into inter-graphene spaces in a graphite particle of an anode or wherein both the anode and cathodes are based on lithium or alkali intercalation in and out of the bulk of solid intercalation compounds.

Example 4: f-NGP Based Surface-Enabled Sodium Ion-Exchanging Batteries

For a fully surface-enabled battery, nano-structured f-NGPs prepared in Example 1 were used as both a cathode active material and as an anode active material. A sodium foil component was added between the anode and the separator. The electrolyte solution was 1 M $NaPF_6$ dissolved in a mixture of ethylene carbonate (EC) and dimethyl carbonate (DMC) with a 3:7 volume ratio. For a partially surface-enabled battery, the anode contains sodium foil as a sodium ion source (but no nano-structured NGP at the anode side) and the cathode is f-NGP. For another type of partially surface-enabled, sodium ion-exchanging battery, $NaMnO_2$ was used as a sodium ion source implemented at the anode. Fine $NaMnO_2$ particles were prepared by high-intensity ball milling of a mixture of $Na_2CO_3$ and $MnO_2$ powders at a molar ratio of 1:2 for 12 hours, followed by heating at 870° C. for 10 hours, a process proposed by Qu, et al. [Q. T. Qu, et al. Journal of Power Sources, 194 (2009) 1222].

Figure 11:
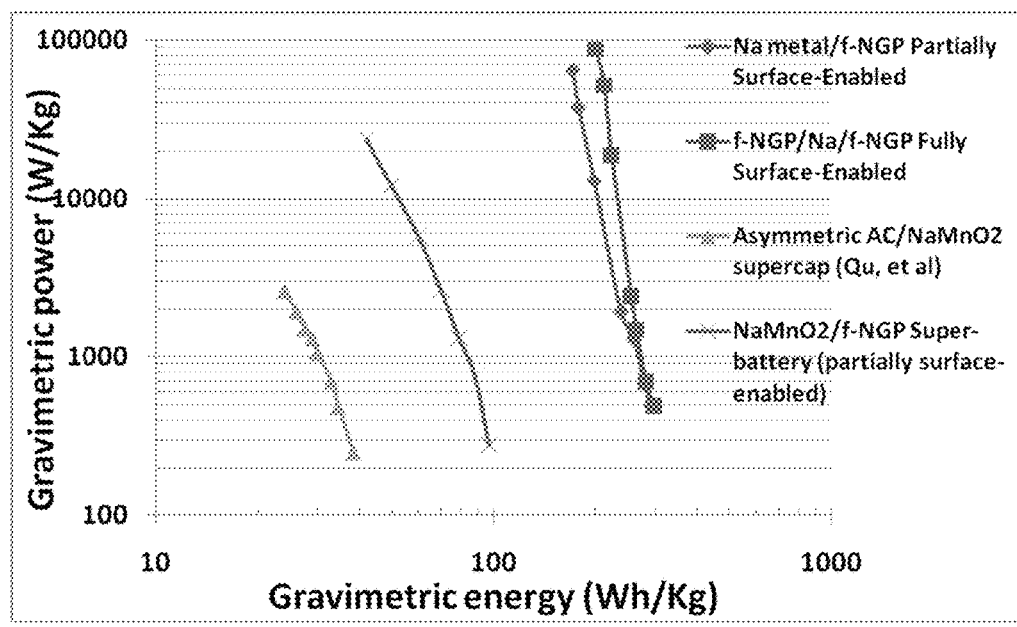
FIG. 11 Ragone plot of four types of cells: a fully surface-enabled alkali ion-exchanging battery, a partially surface-enabled alkali-exchanging cell (containing Na metal powder or foil as a metal ion source at the anode and a functionalized NGP cathode), another partially surface-enabled alkali ion-exchanging battery (with a nano-structured $NaMnO_2$ anode and functionalized NGP cathode), and a prior art asymmetric supercapacitor (Qu, et al) composed of a conventional activated carbon anode, $NaMnO_2$ cathode (micron-scaled particles), and aqueous $Na_2SO_4$ electrolyte.

FIG. 11 shows the Ragone plot of four types of cells: a fully surface-enabled, alkali ion-exchanging battery, a partially surface-enabled alkali-exchanging cell (formed of a Na metal foil at the anode as a Na ion source and a functionalized NGP cathode), another partially surface-enabled, alkali ion-exchanging battery (with a nano-structured $NaMnO_2$ anode and functionalized NGP cathode), and a prior art asymmetric supercapacitor (data re-plotted from Qu, et al). This asymmetric supercapacitor is composed of a conventional activated carbon anode, a $NaMnO_2$ cathode (micron-scaled particles), and aqueous $Na_2SO_4$ electrolyte. These data again demonstrate the superiority of the presently invented surface-enabled, metal ion-exchanging approach in terms of providing both a high power density and high energy density. It may be noted that the asymmetric supercapacitor of Qu, et al does not make use of a nano-structured cathode or anode and does not involve the exchange of sodium ion between the anode and the cathode.

Example 5: Organic Poly(2,5-Dihydroxy-1,4-Benzoquinone-3,6-Methylene) (PDBM) and Nano-Structured NGP-Supported PDBM The PDBM material was synthesized with the following procedure: One gram of 2,5-dihydroxy-1,4-benzoquinone (7.14 m mol) was dissolved in 75 ml of warm glacial acetic acid. An approximately 37% aqueous formaldehyde solution (3 ml) was then added and the resulting mixture was left stirring for 48 h at room temperature. The precipitate was then collected by filtration, thoroughly washed with water, and dried under high vacuum to yield the desired polymer (PDBM) as a yellow solid (approximately 0.85 g).

Two types of electrodes were then prepared. One involved mixing PDBM solid with carbon black (CB) particles and the other involved combining PDBM with graphene oxide. As an example, an amount equal to 0.7 g of the PDBM was dissolved in 100 ml propan-2-ol to form a polymer solution. Non-porous CB particles were then dispersed in the polymer solution to form a suspension at a PBDM/CB weight ratio of 80, 20. Upon removal of solvent in a vacuum oven, PDBM was found to precipitate out as individual solid particles (0.2-0.8 μm in diameter) well mixed with CB particles. On a separate basis, graphene oxide (mostly single-layer graphene sheets supplied by Angstron Materials, Inc., Dayton, Ohio) was dispersed in a similar polymer solution to form a suspension (PBDM/graphene ratio of 95/5). Upon removal of solvent, PDBM was found to stick to the graphene surface as a thin-film coating (possibly a mono-layer of polymer chains physically attached or chemically bonded to graphene oxide). The resulting graphene oxide-supported PDBM was then annealed at 250° C. for 3 hours to thermally reduce graphene oxide to some extent for the purpose of recovering some electronic conductivity.

Coin cells similar to those discussed in Example 3 were prepared and similarly evaluated. The results are summarized in the Ragone plot of FIG. 12(B), which clearly show that the fully surface-enabled battery device based on an NGP-supported PDBM polymer anode and a f-NGP cathode performs much superior to the corresponding partially surface-enabled battery containing a PDBM-CB composite anode and an f-NGP cathode. In both battery devices, sodium powder was added as a sodium ion source at the anode. The PDBM particles in this latter device are sub-micron in diameter, requiring sodium ions to diffuse in and out of the particles. In contrast, the single-layer graphene oxide appears to be capable of interacting with PDBM chains in such a manner that these chains are well-dispersed on massive graphene surfaces (with a specific surface area typically in the range of 300-1,550 $m^2/g$, albeit theoretically up to 2,670 $m^2/g$). In other words, it appears that the precipitation of PDBM chains during solvent removal was constrained by the graphene oxide surface and was prevented from forming bulk PDBM crystal particles. Such a graphene surface-supported PDBM structure makes it possible for the anode operation to be surface-enabled or surface-mediated. The cathode operation (f-NGP) is also surface-enabled. By combining PDBM with graphene oxide to obtain the graphene-supported PDBM, we obtain a much better surface-enabled sodium ion-exchanging battery device in terms of both the energy density and power density at comparable current densities.

Figure 12A:
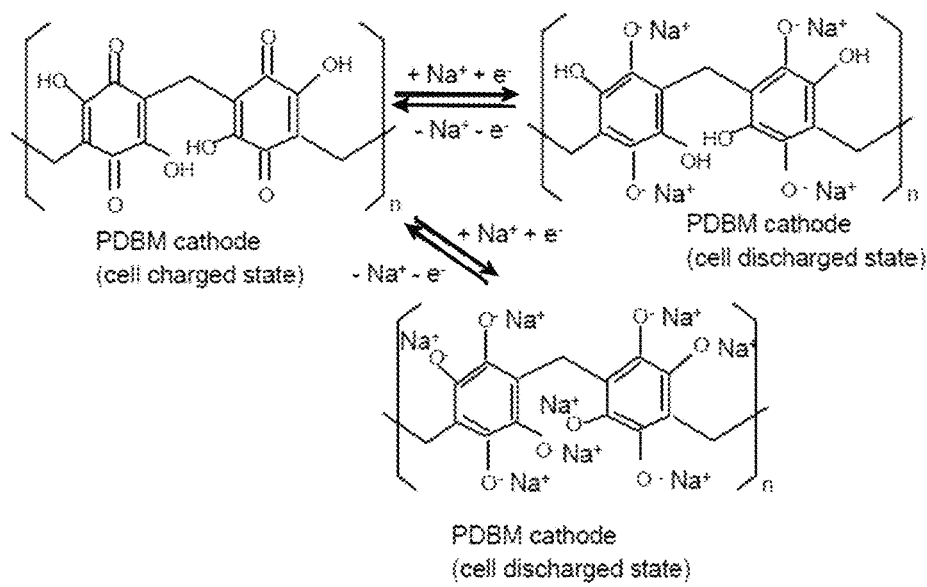
FIG. 12 (A) The carbonyl groups on PDBM cathode material is capable of forming redox pairs with sodium ions (not just lithium ions); and (B) Ragone plot of a partially surface-enabled sodium ion-exchanging battery containing a carbonyl-containing organic material (bulk PDBM particles mixed with non-porous carbon black particles as a conductive additive) as the anode and nano-structured NGP as cathode, and the Ragone plot of a corresponding fully surface-enabled battery with a nano graphene-supported PDBM anode and a functionalized nano graphene cathode. The PDBM molecules are supported by (partially bonded to) graphene oxide surface.
Figure 12B:
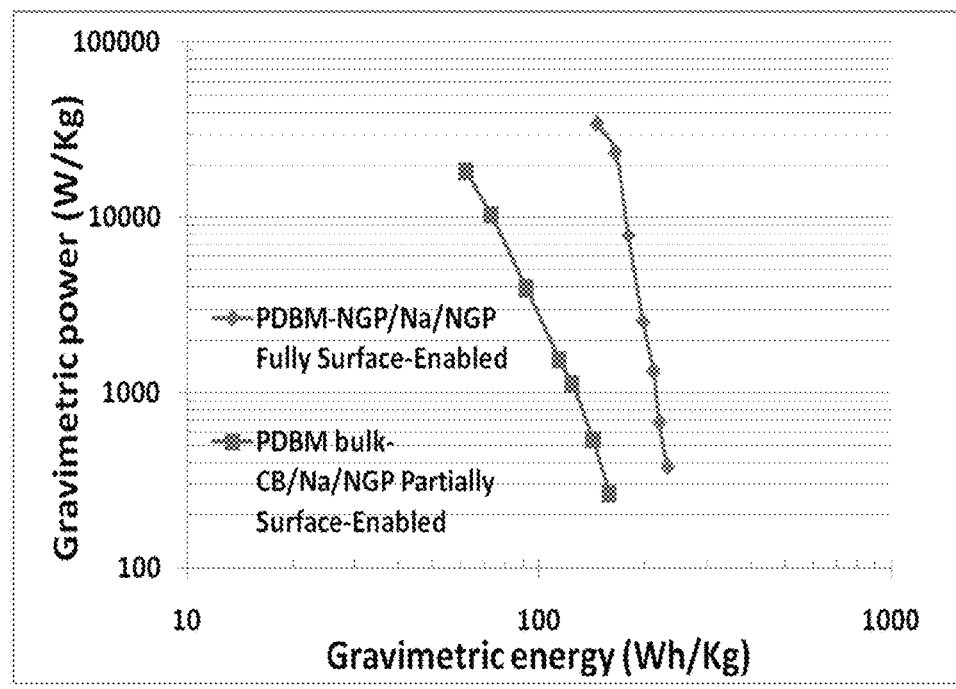

It seems that enolation is a possible reaction of carbonyl double bonds, which can be stabilized by conjugated structures. Enolation makes it possible for sodium ions to be captured or released reversibly at the positions of oxygen atoms when the carbonyl groups are reduced or oxidized. In the reduction process of PDBM, each carbonyl group possibly can receive one electron and capture one Na ion to form sodium enolate, and the Na ions can be released in the reverse oxidation process, as illustrated in FIG. 12(A).

Figure 13:
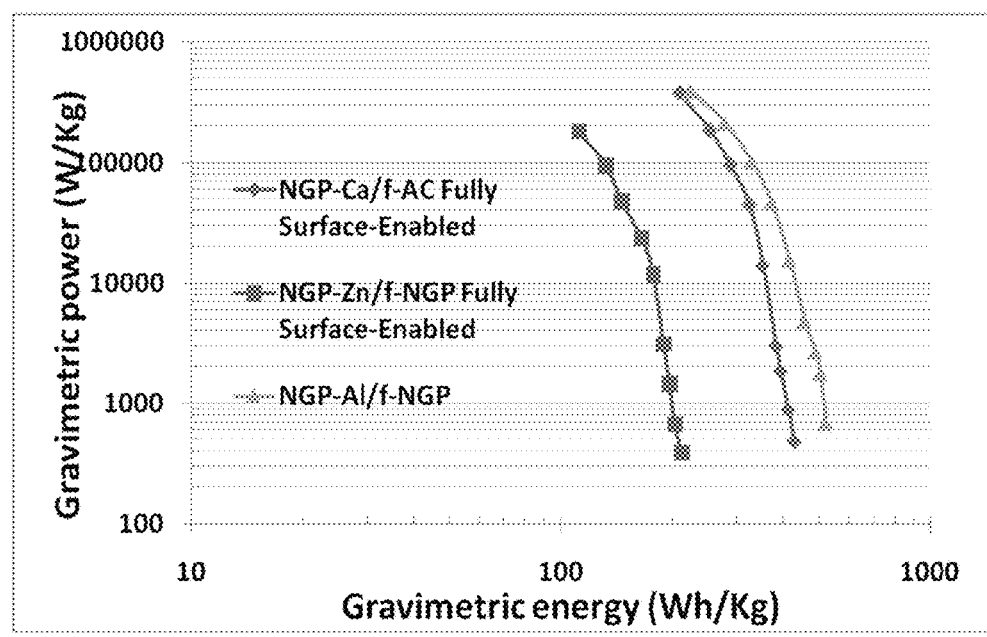
FIG. 13 Ragone plots for three different surface-enabled metal ion-exchanging batteries: Ca, Zn, and Al ion-based.

Example 6: Preparation of Nano-Structured, Functionalized Activated Carbon (f-AC) and f-AC Based Surface-Enabled, Alkaline-Earth Metal Ion-Exchanging Battery Activated carbon (AC, from Ashbury Carbon Co.) was treated with an acid solution (sulfuric acid, nitric acid, and potassium permanganate at a ratio of 4:1:0.05) for 24 hours for the purposes of opening up the gates to facilitate liquid electrolyte entry into the interior of AC particles and to impart functional groups to the surfaces (including edges) of the aromatic rings or small graphene sheets inside AC. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was subjected to further functionalization in formic acid at 25° C. for 30 minutes in an ultrasonication bath. Subsequently, dip-coating was used to obtain thin films of chemically functionalized activated carbon (f-AC) with a thickness of typically between 20 and 150 μm coated on a surface of an aluminized carbon layer as a current collector. Such an electrode was used as an anode and a functionalized NGP material was used as a cathode, with a predetermined amount of calcium powder implemented between a porous separator and one electrode as an alkaline-earth metal ion source. The resulting device is a surface-enabled, alkaline-earth metal ion-exchanging battery (calcium ion as an example). The electrochemical performance of such a surface-enabled, calcium ion-exchanging battery is shown in FIG. 13. This battery device exhibits exceptional power density and energy density.

Example 7: Surface-Enabled, Transition Metal and Other Metal Ion-Exchanging Batteries In this example, a transition metal (Zn) and an example (Al) of other metals in the periodic table of elements are considered. In both cases, NGP is used as a nano-structured anode and f-NGP as a nano-structured cathode. For the aluminum ion-exchanging battery, the electrolyte used was $LiPF_6$ and $Al(BF_4)_3$ (at a ratio of 1:4) dissolved in EC/EMC/MB (at a ratio of 1:1:8), where EC=ethylene carbonate, EMC=ethyl methyl carbonate, and MB=methyl butyrate. For the zinc ion-exchanging battery device, the electrolyte was zinc borofluoride ($Zn(BF_4)_2$) dissolved in the same solvent mixture. The electrochemical performance of these two surface-enabled, Zn ion- and Al-ion exchanging battery devices is also summarized in FIG. 13. These battery devices again exhibit exceptional power density and energy density.

Figure 14:
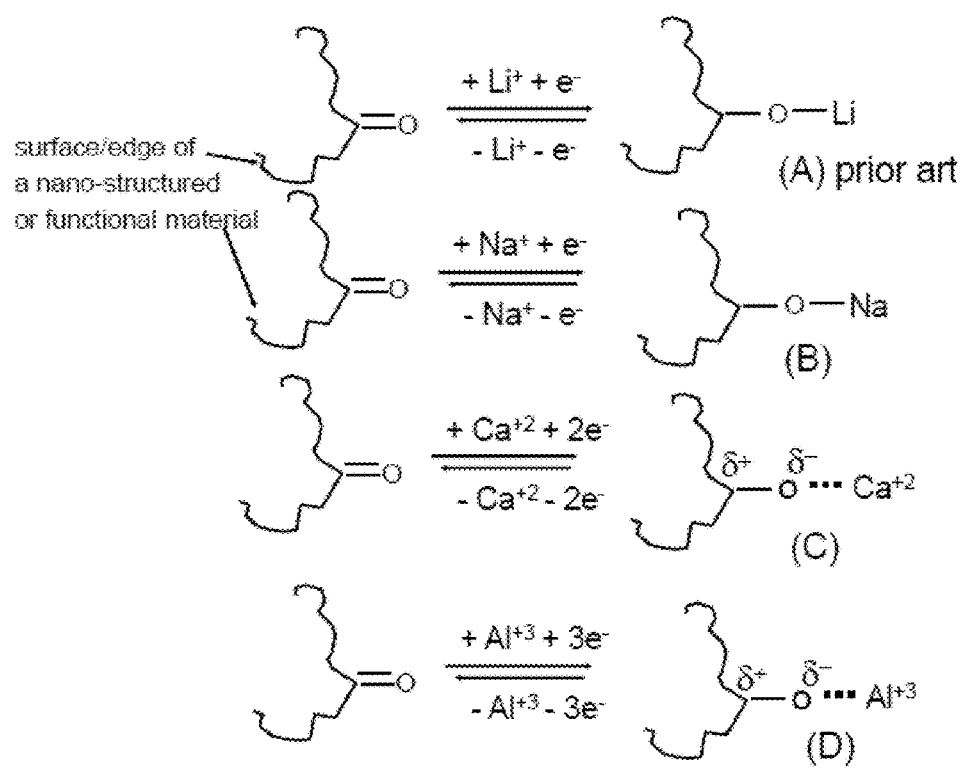
FIG. 14 Various plausible surface-mediated metal ion-storing or capturing mechanisms: (A) Prior art surface redox pair between a carbonyl group and a lithium ion; (B) surface redox pair between a carbonyl group and a sodium ion; (C) surface chemical complex between a carbonyl group and a calcium ion; and (D) surface chemical complex between a carbonyl group and an aluminum ion.

The above examples, along with chemical analysis results, suggest that the surfaces (including edges) of nano-structured materials (such as nano graphene, porous hard carbon, carbon nanotubes, etc), with a proper chemical functionalization treatment, are imparted with functional groups that are capable of rapidly and reversibly react or interact with a wide range of metal ions to form surface redox pairs or chemical complexes, as illustrated in FIG. 14.

The following conclusions may be drawn from the above discussion:

(1) The instant invention provides a revolutionary energy storage device that has or exceeds the best performance features of both the supercapacitor and the lithium ion battery.

(2) The device can deliver a power density higher than that of the best supercapacitor by a factor of 5-10 and an energy density higher than that of the best supercapacitor by a factor of 20.

(3) The presently invented surface-enabled, metal-ion exchanging battery device using a functionalized nano-structured carbon (such as porous disordered carbon, CNT, and NGP) as an anode and as a cathode also exhibits a power density of approximately 10-60 times higher than that of conventional lithium-ion batteries.

(4) These surface-enabled batteries can be re-charged in seconds, as opposed to hours for conventional lithium ion batteries.

(5) State-of-art Li-air cells can only be operated for a small number of cycles (typically <50 cycles) and the best lithium-ion batteries only for <1000 cycles, but our surface-enabled devices are capable of cycling for tens of thousands or hundreds of thousands of cycles.

(6) This new surface-enabled, metal ion-exchanging battery device is patently distinct from the conventional super-capacitor that operates on the electric double layer (EDL)

or pseudo-capacitance mechanism. The supercapacitor does not involve the exchange of ions between an anode and a cathode during charging and discharging.

(7) This new surface-enabled, metal ion-exchanging battery device is patently distinct from the conventional lithium-ion, sodium-ion, or potassium-ion batteries because the anode and/or the cathode (typically both electrodes) in these conventional batteries rely on intercalation (solid-state diffusion) of metal ions in and out of the bulk of electrode active material particles, which is a painfully slow process.

(8) It may be noted that most of the metal ions (e.g. $Ca^{2+}$, $Zn^{2+}$, $Al^{3+}$, etc) are relatively large in size (all significantly greater than the size of $Li^+$) and it would be difficult or impossible to find an anode intercalation compound and a cathode intercalation compound that are amenable to insertion (intercalation) and extraction (de-intercalation) of these large metal ions into/from the interior of these solid compounds. The presently invented surface-mediation or surface-enabling approach obviates the need for such a solid state diffusion. This strategy enables those divalent, trivalent, or other multivalent metal ions (that have more than one charge unit per ion) to be used as a charge carrier being shuttled between an anode and a cathode. This is very significant since, as an example, each exchange of an $Al^{3+}$ involves the delivery of three electrons, not just one.

(9) This surface-mediation or surface-enabling approach basically provides a safe, fast, and tentative but stable mechanism to "store" or capture all kinds of metal ions (atoms) on the surface of a nano-structured or functional material, as opposed to having to form a metal oxide in the electrolyte or cathode of a metal-air battery, or having to form metal sulfide (e.g. lithium sulfide or polysulfide) in the electrolyte or cathode of a metal-sulfur battery. The reverse reactions (reduction) of these metal-air and metal-sulfur cells (or metal-halogen, metal selenium cells, etc) are notoriously slow or not considered possible even with the assistance from expensive electro-catalysts.

(10) The presently invented surface-enabled, metal ion-exchanging battery device represents a truly major breakthrough or revolutionary energy storage technology that has tremendous utility value. The commercialization of this technology will have a major, highly positive impact to the environment and society.

We claim:

1. A partially or fully surface-enabled, metal ion-exchanging battery device comprising (a) a positive electrode (cathode), (b) a negative electrode (anode), (c) a porous separator disposed between said cathode and said anode, and (d) an electrolyte in physical contact with said cathode and said anode, wherein said electrolyte contains an alkali metal ion that is exchanged between said cathode and said anode during an operation of said battery device and said alkali metal is selected from sodium (Na), potassium (K), rubidium (Rb), cesium (Cs), francium (Fr), or a combination thereof; wherein at least one of said cathode and said anode contains therein a source of said alkali metal ion prior to a first charge or a first discharge cycle of the battery device and at least the cathode comprises nano graphene having a surface-borne metal ion-capturing functional group or comprises a nano-structured material having a metal ion-storing surface in direct contact with said electrolyte to reversibly capture or store said alkali metal ion during charge-discharge operations of said battery, wherein the nano graphene is selected from a single-layer graphene sheet or a multi-layer graphene platelet, wherein said nano graphene is surrounded by interconnected pores having a size from 2 to 50 nm, and wherein said operations of said battery device does not involve the introduction of oxygen from outside said device, does not involve solid state diffusion of said alkali metal ions in and out of bulk of said cathode, and does not involve the formation of a metal oxide, metal sulfide, metal selenide, metal telluride, metal hydroxide, or metal-halogen compound.

2. The partially or fully surface-enabled, metal ion-exchanging battery device of claim 1, wherein said battery device further contains a metal ion selected from alkaline-earth metals consisting of beryllium (Be), magnesium (Mg), calcium (Ca), strontium (Sr), barium (Ba), radium (Ra), combinations thereof, and their combinations with lithium that is exchanged between said cathode and said anode during an operation of said battery device, and the electrolyte further contains a metal ion selected from lithium ion, an alkaline earth metal ion beryllium (Be) ion, magnesium (Mg) ion, calcium (Ca) ion, strontium (Sr) ion, barium (Ba) ion, radium (Ra) ion, or a combination thereof, and does not involve solid state diffusion of said alkaline-earth metal ions in and out of bulk of said cathode.

3. The battery device of claim 1, wherein the electrolyte comprises liquid electrolyte or gel electrolyte.

4. The battery device of claim 1, wherein the electrolyte comprises a metal ion salt of said alkali metal, an alkaline-earth metal, transition metal, aluminum (Al), gallium (Ga), indium (In), tin (Sn), lead (Pb), or bismuth (Bi), and said metal ion salt is dissolved in an organic solvent.

5. The battery device of claim 1, wherein the electrolyte comprises a metal ion salt selected from lithium perchlorate ($LiClO_4$), sodium perchlorate ($NaClO_4$), potassium perchlorate ($KClO_4$), lithium hexafluorophosphate ($LiPF_6$), sodium hexafluorophosphate ($NaPF_6$), potassium hexafluorophosphate ($KPF_6$), transition metal hexafluorophosphate, aluminum hexafluorophosphate ($Al(PF_6)_3$), lithium borofluoride ($LiBF_4$), sodium borofluoride ($NaBF_4$), potassium borofluoride ($KBF_4$), calcium borofluoride ($Ca(BF_4)_2$), aluminum borofluoride ($Al(BF_4)_3$), transition metal borofluoride, alkaline-earth metal borofluoride, lithium hexafluoroarsenide ($LiAsF_6$), alkali metal hexafluoroarsenide, transition metal hexafluoroarsenide, aluminum hexafluoroarsenides, lithium trifluoro-metasulfonate ($LiCF_3SO_3$), bis-trifluoromethyl sulfonylimide lithium [$LiN(CF_3SO_2)_2$], or a combination thereof.

6. The battery device of claim 1, wherein the electrolyte comprises a solvent selected from ethylene carbonate (EC), dimethyl carbonate (DMC), methylethyl carbonate (MEC), diethyl carbonate (DEC), methyl butyrate (MB), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA), or a combination thereof, and does not involve solid state diffusion of ions in and out of bulk of the cathode of claim 1.

7. The battery device of claim 1, wherein the alkali metal ion source comprises an alkali metal chip, alkali metal foil, alkali metal powder, surface stabilized alkali metal particles, or a combination thereof.

8. A partially or fully surface-enabled, metal ion-exchanging battery device comprising (a) a positive electrode (cathode), (b) a negative electrode (anode), (c) a porous separator disposed between said cathode and said anode, and (d) an electrolyte in physical contact with said cathode and said anode, wherein said electrolyte contains an alkali metal ion that is exchanged between said cathode and said anode during an operation of said battery device and said alkali metal is selected from sodium (Na), potassium (K), rubidium (Rb), cesium (Cs), francium (Fr), or a combination thereof; wherein at least one of said cathode and said anode contains therein a source of said alkali metal ion prior to a first charge or a first discharge cycle of the battery device and at least the cathode comprises a functional material having a surface-borne metal ion-capturing functional group or a nano-structured material having a metal ion-storing surface in direct contact with said electrolyte to reversibly capture or store said alkali metal ion during charge-discharge operations of said battery, wherein each of the two electrodes comprises a nano graphene material selected from a single-layer graphene sheet or a multi-layer graphene platelet, wherein said nano graphene material is surrounded by interconnected pores having a size from 2 to 50 nm, and wherein said operations of said battery device does not involve the introduction of oxygen from outside said device, does not involve solid state diffusion of said alkali metal ions in and out of bulk of said cathode, and does not involve the formation of a metal oxide, metal sulfide, metal selenide, metal telluride, metal hydroxide, or metal-halogen compound.

9. The battery device of claim 1 wherein at least one of the functional materials has a functional group selected from —COOH, =O, —NH$_2$, —OR, or —COOR, where R is a hydrocarbon radical.

10. The battery device of claim 1 wherein said electrolyte further comprises lithium (Li) ions and/or the exchanging metal ion source further contains a Li ion source.

11. The battery device of claim 1 wherein said electrolyte comprises an alkali metal salt-doped ionic liquid.

12. The battery device of claim 1 wherein the electrolyte is aqueous electrolyte.

13. The battery device of claim 1 wherein the electrolyte is organic electrolyte.

* * * * *